United States Patent
Miyabe et al.

(10) Patent No.: US 10,305,588 B2
(45) Date of Patent: May 28, 2019

(54) NETWORK MANAGEMENT DEVICE AND NETWORK MANAGEMENT METHOD

(71) Applicant: FUJITSU LIMITED, Kawasaki-shi, Kanagawa (JP)

(72) Inventors: Masatake Miyabe, Kawasaki (JP); Toru Katagiri, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 27 days.

(21) Appl. No.: 15/809,414

(22) Filed: Nov. 10, 2017

(65) Prior Publication Data

US 2018/0138973 A1    May 17, 2018

(30) Foreign Application Priority Data

Nov. 17, 2016  (JP) .................. 2016-224225

(51) Int. Cl.
*H04B 10/07* (2013.01)
*H04B 10/079* (2013.01)
*H04J 14/02* (2006.01)

(52) U.S. Cl.
CPC ........ *H04B 10/0795* (2013.01); *H04J 14/021* (2013.01); *H04J 14/0221* (2013.01)

(58) Field of Classification Search
CPC .. H04B 10/0795; H04J 14/021; H04J 14/0221

USPC ......................... 398/25, 26, 27, 34
See application file for complete search history.

(56) References Cited

U.S. PATENT DOCUMENTS

| | | | |
|---|---|---|---|
| 2002/0048062 A1 | 4/2002 | Sakamoto et al. | |
| 2004/0127216 A1 | 7/2004 | Fukushima | |
| 2011/0318007 A1* | 12/2011 | Oikawa | H04B 10/0793 398/50 |
| 2016/0036521 A1* | 2/2016 | Miyabe | H04B 10/032 398/5 |
| 2017/0310391 A1* | 10/2017 | Oda | H04B 10/0795 |

FOREIGN PATENT DOCUMENTS

| | | |
|---|---|---|
| JP | 2002-57624 | 2/2002 |
| JP | 2004-208008 | 7/2004 |

* cited by examiner

*Primary Examiner* — Tesfaldet Bocure
(74) *Attorney, Agent, or Firm* — Staas & Halsey LLP

(57) ABSTRACT

There is provided a network management device including a memory in which a change rate of a transmission quality of a first optical signal to be transmitted on a first path with respect to a power of the first optical signal is stored, and a processor coupled to the memory and the processor configured to determine, based on the change rate, whether to set a second path on which a second optical signal transmits to overlap with at least a portion of a route of the first path.

20 Claims, 24 Drawing Sheets

FIG. 13

NETWORK CONFIGURATION DATABASE

130

| LINK ID | CONNECTION NODE ID | USABLE/ UNUSABLE |
|---|---|---|
| #1 | #2,#3 | USABLE |

PATH DATABASE

131

| PATH ID | PASSING NODE ID | POWER | INCLINATION OF Q VALUE | POWER (BACKUP) | INCLINATION OF Q VALUE (BACKUP) |
|---|---|---|---|---|---|
| Ra | #3,#4,#5,#6 | 0.6(dBm) | 0.99 | | |

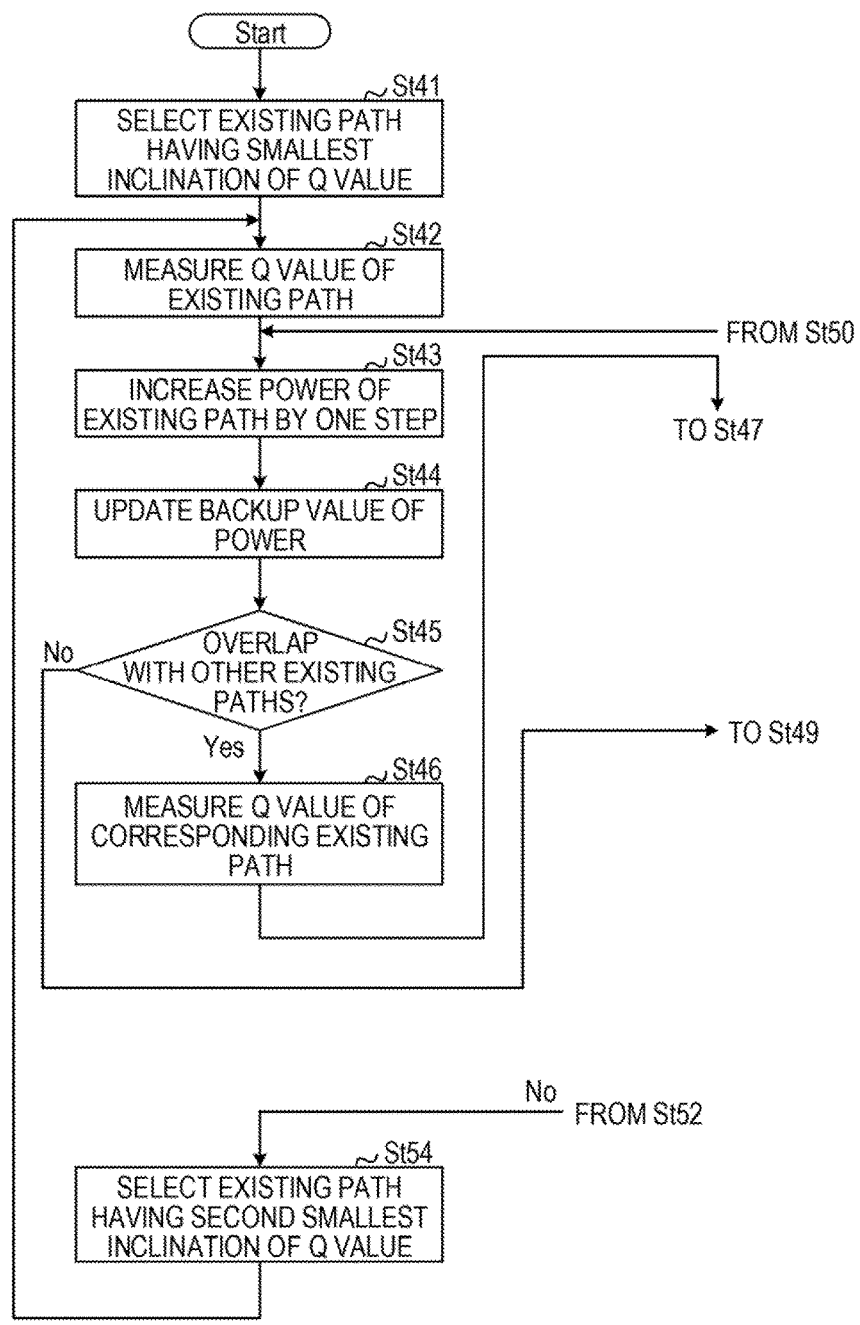

FIG. 18

| PATH ID | PASSING NODE ID | POWER | INCLINATION OF Q VALUE | POWER (BACKUP) | INCLINATION OF Q VALUE (BACKUP) |
|---|---|---|---|---|---|
| Ra | #3,#4,#5,#6 | 0.7(dBm) | 0.49 | | |
| Rb | #4,#5,#6 | 0.5(dBm) | 0.85 | | |

FIG. 20

| PATH ID | PASSING NODE ID | POWER | INCLINATION OF Q VALUE | POWER (BACKUP) | INCLINATION OF Q VALUE (BACKUP) |
|---|---|---|---|---|---|
| Ra | #3,#4,#5,#6 | 0.7(dBm) | 0.49 | | |
| Rb | #4,#5,#6 | 0.5(dBm) | 0.85 | | |
| Rc | #3,#2,#5 | 0.6(dBm) | 0.91 | | |

131

US 10,305,588 B2

NETWORK MANAGEMENT DEVICE AND NETWORK MANAGEMENT METHOD

CROSS-REFERENCE TO RELATED APPLICATION

This application is based upon and claims the benefit of priority of the prior Japanese Patent Application No. 2016-224225, filed on Nov. 17, 2016, the entire contents of which are incorporated herein by reference.

FIELD

The embodiments discussed herein are related to a network management device and a network management method.

BACKGROUND

A reconfigurable optical add and drop multiplexer (ROADM) has been known, for example, as a transmission device that wavelength-multiplexes a plurality of optical signals having different wavelengths for a transmission. In setting a path within a network including transmission devices each wavelength-multiplexing and transmitting a plurality of optical signals having different wavelengths, the transmission quality of an optical signal is estimated by calculating cumulative values of attenuation, noise, waveform distortion and others of the optical signal that occur in a transmission device or transmission line on a path of the optical signal, based on a transmission characteristic of the transmission device or transmission line. Then, the estimated transmission quality and a required transmission quality are compared with each other, and when the path is determined to be able to normally transmit the optical signal as a result of the comparison, the path is set in the network.

In order to estimate the transmission performance of an optical signal path and determine whether the path is able to perform a transmission, a network management device is equipped with a transmission characteristic database in which various data related to the transmission characteristic of an optical signal in a transmission line or transmission device are registered. Since the transmission characteristic of an optical signal varies depending on combinations of wavelengths or powers of optical signals to be wavelength-multiplexed with the optical signal, the data registered in the transmission characteristic database are only related to the transmission characteristic of a predetermined combination that is estimated in designing the network.

With regard to the transmission characteristic, for example, Japanese Laid-Open Patent Publication No. 2002-057624 discloses that, in order to suppress the difference in the transmission characteristics of the optical signals of the respective wavelengths, the setting of a transmitting side of a wavelength-multiplexed optical signal is feedback-controlled according to a bit error rate or the like measured by a receiving side of the optical signal.

SUMMARY

According to an aspect of the invention, a network management device includes a memory in which a change rate of a transmission quality of a first optical signal to be transmitted on a first path with respect to a power of the first optical signal is stored, and a processor coupled to the memory and the processor configured to determine, based on the change rate, whether to set a second path on which a second optical signal transmits to overlap with at least a portion of a route of the first path.

The object and advantages of the disclosure will be realized and attained by means of the elements and combinations particularly pointed out in the claims.

It is to be understood that both the foregoing general description and the following detailed description are exemplary and explanatory and are not restirctive of the disclosure, as claimed.

BRIEF DESCRIPTION OF DRAWINGS

FIG. 13 is a view illustrating an example of each of a network configuration database and a path database;

FIGS. 16A and 16B are a flowchart illustrating an example of a process of adjusting a power of an existing path;

FIG. 18 is a view illustrating an example of a path database in which the two paths are registered;

FIG. 20 is a view illustrating an example of a path database in which the three paths are registered;

DESCRIPTION OF EMBODIMENTS

Since there exist individual differences in the transmission characteristics of the transmission lines and the transmission devices, data are stored with margins corresponding to the differences in the transmission characteristic database in which various data related to the transmission characteristic of an optical signal in a transmission line or transmission device are registered. In addition, when transmission devices of different vendors (manufacturers) are present together in the network, it may be taken into account that while transmission characteristics of transmission devices of the vendor providing the network management device are already known, transmission characteristics of transmission devices provided by other vendors may be unknown, and data of the transmission devices with unknown transmission characteristics may not be registered in advance in the transmission characteristic database. In the transmission characteristic database, only the data related to the transmission characteristic of a predetermined combination that is estimated in designing the network are registered.

As described above, various restrictions are present in the network management that utilizes the transmission characteristic database, and it may be difficult to perform a determination of the path setting with high accuracy. Thus, it may be difficult to implement, for example, a path design for effectively using the performance of the network.

Hereinafter, with reference to the accompanying drawings, descriptions will be made on embodiments of the technology in which a setting of a new path may be determined with high accuracy by using a database of paths that have been set in a network.

Figure 1:
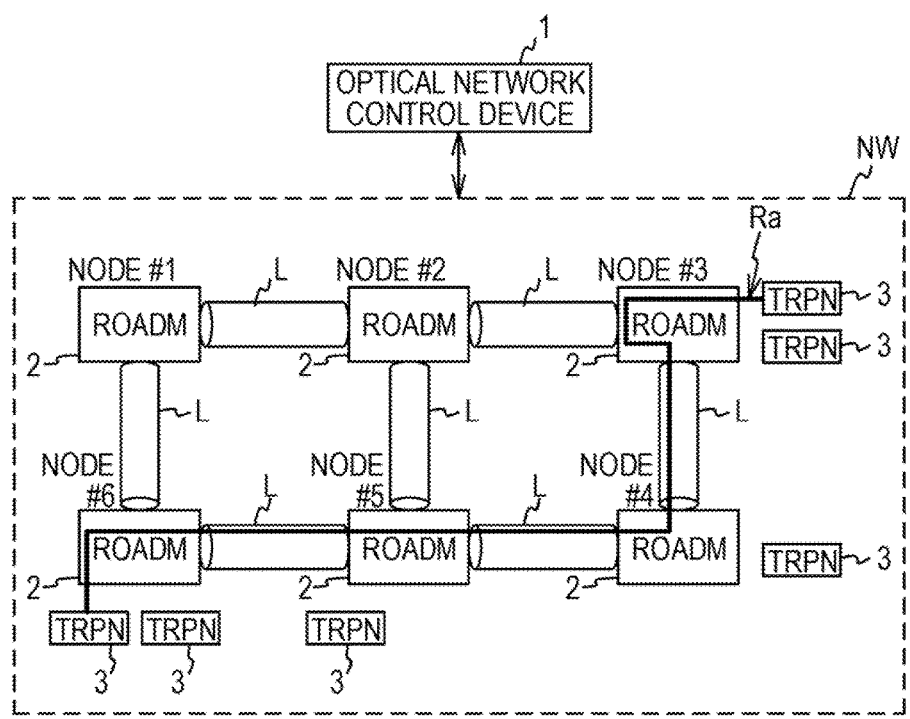
FIG. 1 is a configuration diagram illustrating an example of a network system.

FIG. 1 is a configuration diagram illustrating an example of a network system. The network system includes an optical network control device 1 and a network NW including a plurality of nodes #1 to #6. ROADMs (#1 to #6) 2 each serving as an example of a transmission device are provided in the nodes #1 to #6, respectively. One or more transponders (TRPNs) 3 are connected to each ROADM (#1 to #6) 2.

Of the nodes #1 to #6, adjacent nodes are connected to each other by a link L. More specifically, adjacent ROADMs 2 are connected to each other by an optical fiber that serves as a transmission line.

Each ROADM 2 wavelength-multiplexes a plurality of optical signals having different wavelengths and transmits the wavelength-multiplexed optical signal. Based on a setting from the optical network control device 1, the ROADM 2 wavelength-multiplexes optical signals input from the transponder 3 into a wavelength-multiplexed optical signal, and separates optical signals having a predetermined wavelength from the wavelength-multiplexed optical signal to output the optical signals to the transponder 3. That is, the ROADM 2 receives input of optical signals from another network, and branches the optical signals to another network.

The optical network control device 1 is an example of a network management device, and sets a path Ra of an optical signal by performing various controls for the network NW. For example, the path Ra of an optical signal is formed to have the nodes #3 and #6 as start and end points, respectively, and passes through the ROADMs 2 of the nodes #3 to #6. Thus, for example, an optical signal is transmitted from the transponder 3 of the node #3 and received by the transponder 3 of the node #6. That is, the transponder 3 functions as a transmission device or a receiving device of an optical signal.

Further, the optical network control device 1 controls the power of the optical signal for the ROADMs 2 on the path Ra such that the transmission quality of the optical signal of the path Ra becomes a target value.

Figure 2:
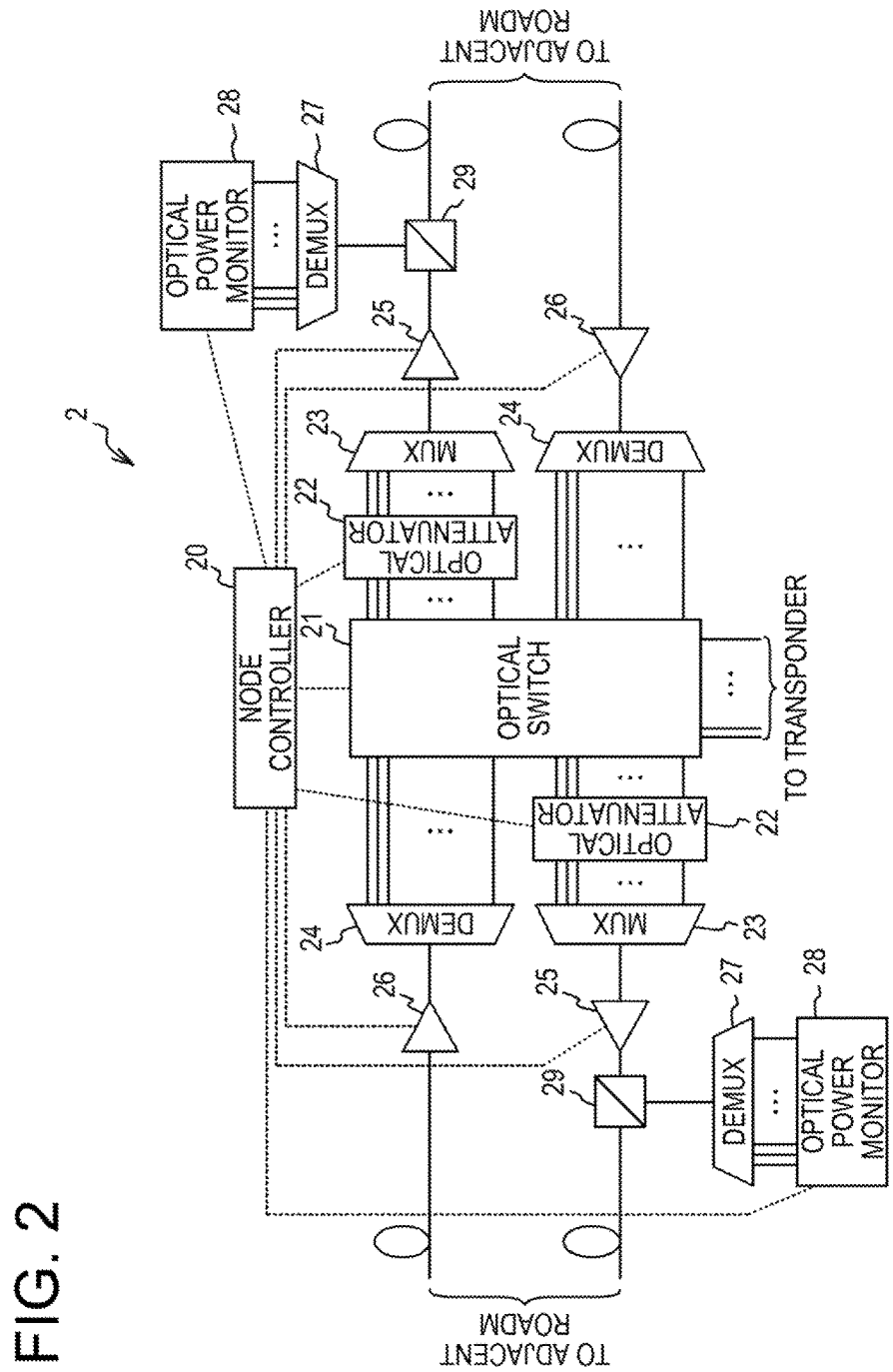
FIG. 2 is a configuration diagram illustrating an example of a ROADM.

FIG. 2 is a configuration diagram illustrating an example of a ROADM 2. The ROADM 2 includes a node controller 20, an optical switch 21, an optical attenuator 22, a multiplexer (MUX) 23, demultiplexers (DEMUX) 24 and 27, a post-amplifier 25, a pre-amplifier 26, an optical power monitor 28, and an optical splitter 29.

The pre-amplifier 26 is formed with, for example, an erbium-doped fiber. The pre-amplifier 26 amplifies a wavelength-multiplexed optical signal input from the ROADM 2 of an adjacent node and outputs the amplified optical signal to the demultiplexer 24. The amplification factor of the pre-amplifier 26 is controlled by the node controller 20. The demultiplexer 24 is formed with, for example, an arrayed-waveguide grating (AWG). The demultiplexer 24 demultiplexes the wavelength-multiplexed optical signal into the optical signals of the respective wavelengths and outputs the demultiplexed optical signals to the optical switch 21.

The optical switch 21 is formed with, for example, a wavelength selective switch (WSS), and outputs the optical signals of the respective wavelengths from specific output ports according to a setting from the node controller 20. The optical switch 21 outputs an optical signal of a wavelength which has been set to be branched by the node controller 20, from the demultiplexer 24 to the transponder 3, and outputs an optical signal of a wavelength which has been set to be inserted by the node controller 20, from the transponder 3 to the optical attenuator 22. Further, the optical switch 21 outputs an optical signal of a wavelength which has been set to pass by the node controller 20, from the demultiplexer 24 to the optical attenuator 22.

The optical attenuator 22 attenuates the optical signals input from the optical switch 21 for each wavelength and outputs the attenuated optical signals to the multiplexer 23. The attenuation factor of the optical attenuator 22 is controlled by the node controller 20 on a wavelength basis. The multiplexer 23 is formed with, for example, an optical coupler. The multiplexer 23 multiplexes the optical signals of the respective wavelengths input from the optical attenuator 22 and outputs the multiplexed optical signal to the post-amplifier 25.

The post-amplifier 25 is formed with, for example, an erbium-doped fiber. The post-amplifier 25 amplifies the wavelength-multiplexed optical signal input from the multiplexer 23 and outputs the amplified wavelength-multiplexed optical signal to the optical splitter 29. The amplification factor of the post-amplifier 25 is controlled by the node controller 20.

The optical splitter 29 branches the wavelength-multiplexed optical signal input from the post-amplifier 25, to the ROADM 2 of an adjacent node and the demultiplexer 27. The demultiplexer 27 is formed with, for example, an arrayed waveguide grating. The demultiplexer 27 demultiplexes the wavelength-multiplexed optical signal into the optical signals of the respective wavelengths and outputs the demultiplexed optical signals to the optical power monitor 28.

The optical power monitor 28 is formed with, for example, a photodiode and measures a power (dBm) of the optical signal of each wavelength input from the demultiplexer 27. The optical power monitor 28 notifies the power of the optical signal of each wavelength to the node controller 20.

The node controller 20 is formed with, for example, a central processing unit (CPU) circuit and controls the operation of the ROADM 2. For example, the node controller 20 sets paths in the optical switch 21 according to a path setting instruction from the optical network control device 1.

For example, in a case where the node controller 20 receives an instruction, from the optical network control device 1, to set the corresponding node as the start point of the path Ra of an optical signal having a wavelength λa, the node controller 20 performs a setting for insertion of the wavelength λa to the optical switch 21. Accordingly, the optical switch 21 introduces the optical signal of the wavelength λa input from the transponder 3 to the ROADM 2 of an adjacent node.

For example, in a case where the node controller 20 receives an instruction, from the optical network control device 1, to set the corresponding node as the relay point of the path Ra of the optical signal having the wavelength Aa, the node controller 20 performs a setting for pass of the wavelength λa to the optical switch 21. Accordingly, the optical switch 21 introduces the optical signal of the wavelength λa input from the ROADM 2 of one adjacent node to the ROADM 2 of the other adjacent node.

For example, in a case where the node controller 20 receives an instruction, from the optical network control device 1, to set the corresponding node as the end point of the path Ra of the optical signal having the wavelength λa, the node controller 20 performs a setting for branch of the wavelength λa to the optical switch 21. Accordingly, the optical switch 21 introduces the optical signal of the wavelength λa input from the ROADM 2 of an adjacent node to the transponder 3.

In this way, the node controller 20 may set the path Ra of the optical signal of the arbitrary wavelength λa according to an instruction from the optical network control device 1.

Further, the node controller 20 controls the power of the optical signal of the already set path Ra, according to an instruction from the optical network control device 1. More specifically, the node controller 20 controls the amplification factors of the pre-amplifier 26 and the post-amplifier 25, and the attenuation factor of the optical attenuator 22. At this time, the node controller 20 performs a feedback control by acquiring the power of the optical signal of the path Ra from the optical power monitor 28.

As described above, the ROADM 2 sets the path of the optical signal of each wavelength and the power (optical level) of the optical signal of the path, according to an instruction from the optical network control device 1.

Figure 3:
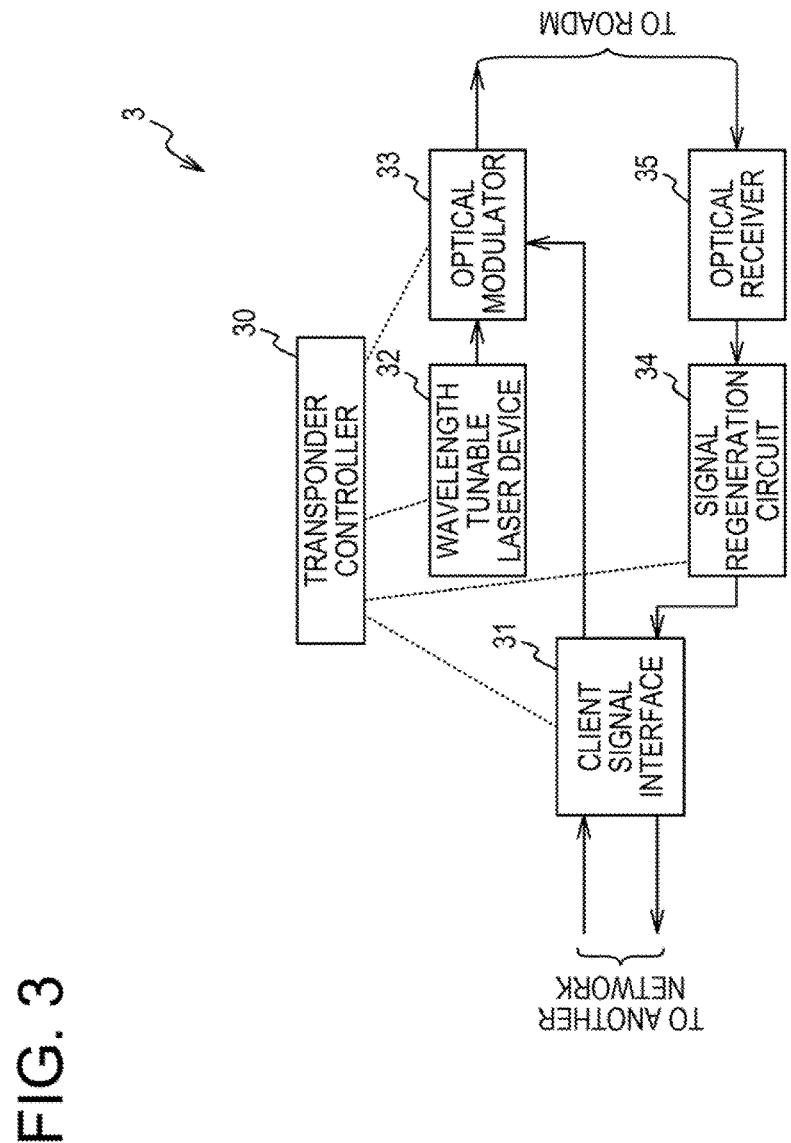
FIG. 3 is a configuration diagram illustrating an example of a transponder.

FIG. 3 is a configuration diagram illustrating an example of the transponder 3. The transponder 3 is connected to the ROADM 2. The transponder 3 transmits an optical signal of a wavelength to be inserted, to the ROADM 2, and receives an optical signal of a wavelength to be branched, from the ROADM 2.

The transponder 3 includes a transponder controller 30, a client signal interface 31, a wavelength tunable laser device 32, an optical modulator 33, a signal regeneration circuit 34, and an optical receiver 35.

The client signal interface 31 is formed with, for example, an optical transceiver or a circuit such as a field programmable gate array (FPGA) or an application specific integrated circuit (ASIC), and transmits/receives a client signal with other networks. The client signal may be, for example, an Ethernet (registered trademark; this example is identically applied hereinbelow) signal, but is not limited thereto. The client signal interface 31 transmits a client signal input from the signal regeneration circuit 34 to another network, and outputs a client signal received from another network to the optical modulator 33.

The wavelength tunable laser device 32 is formed with, for example, a light source or a wavelength filter, and outputs light of a wavelength instructed by the transponder controller 30 to the optical modulator 33. The optical modulator 33 is, for example, the Mach-Zehnder modulator and optically modulates the light of the wavelength input from the wavelength tunable laser device 32 with the data of the client signal input from the client signal interface 31. The optical modulator 33 transmits the optical signal obtained by the optical modulation, to the ROADM 2.

The optical receiver 35 is formed with, for example, a photodiode and receives the optical signal from the ROADM 2. The optical receiver 35 photoelectrically converts the received optical signal into an electric signal and outputs the electric signal to the signal regeneration circuit 34.

The signal regeneration circuit 34 is formed with, for example, an FPGA or ASIC, and regenerates the client signal from the electric signal input from the optical receiver 35. When the electric signal is received, the signal regeneration circuit 34 calculates a bit error rate of the optical signal based on, for example, an error correction code (e.g., forward error correction (FEC)) included in the electric signal. The signal regeneration circuit 34 outputs the regenerated client signal to the client signal interface 31.

The transponder controller 30 is formed with, for example, a CPU circuit and controls the operation of the transponder 3. The transponder controller 30 controls the client signal interface 31, the wavelength tunable laser device 32, and the optical modulator 33 such that the optical signal of the predetermined wavelength is transmitted/received with the ROADM 2 with a predetermined power, according to an instruction from the node controller 20 of the ROADM 2. The node controller 20 instructs the transponder controller 30 to set a wavelength and a path of the optical signal, according to an instruction from the optical network control device 1.

Further, the transponder controller 30 acquires the bit error rate from the signal regeneration circuit 34 and transmits the bit error rate to the node controller 20, in response to a request from the node controller 20. The node controller 20 acquires the bit error rate of the optical signal from the transponder controller 30 and transmits the bit error rate of the optical signal to the optical network control device 1, according to an instruction from the optical network control device 1.

In this way, the transponder 3 sets a wavelength and a power (optical level) of the optical signal, according to an instruction from the optical network control device 1. Further, the transponder 3 measures the error rate of the optical signal and notifies the error rate to the optical network control device 1.

In the network NW illustrated in FIG. 1, as described above, each optical signal is wavelength-multiplexed with other optical signals having different wavelengths and transmitted as a wavelength-multiplexed optical signal. Thus, the transmission quality of the optical signal is affected and changed by other optical signals to be wavelength-multiplexed. The transmission characteristic of the optical signal will be described below.

Figure 4:
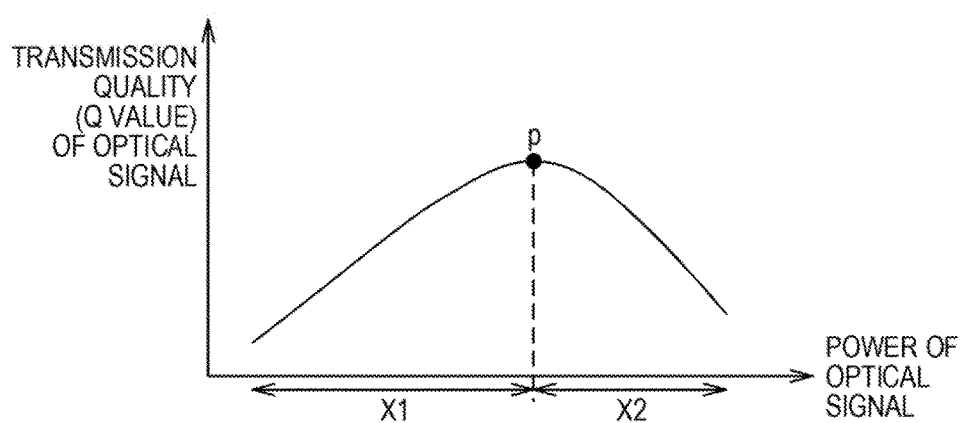
FIG. 4 is a view illustrating the relationship between a power and a transmission quality of an optical signal.

FIG. 4 is a view illustrating a relationship between the power and the transmission quality of an optical signal. In FIG. 4, the horizontal axis indicates the power (dBm) of an optical signal, and the vertical axis indicates the transmission quality of an optical signal. Here, a Q value is used as an example of an index value for the transmission quality. As described later, the Q value is calculated from an error rate by using an error function.

As illustrated in FIG. 4, the transmission quality is represented as a graph which is upwardly convex having a peak p with respect to the power. More specifically, the transmission quality increases as the power increases, in the region X1 where the power is smaller than the value of the peak p. This is because the optical signal-to-noise ratio (OSNR) increases as the power increases.

In addition, the transmission quality decreases as the power increases, in the region X2 where the power is larger than the value of the peak p. This is because, when the power exceeds the value of the peak p, the phase distortion of the optical signal due to a nonlinear optical effect during the transmission increases.

As described above, since the transmission quality of the optical signal decreases when the power exceeds the peak p, the optical network control device 1 controls the power of the optical signal within the region X1 where the power does not exceed the peak p.

Figure 5:
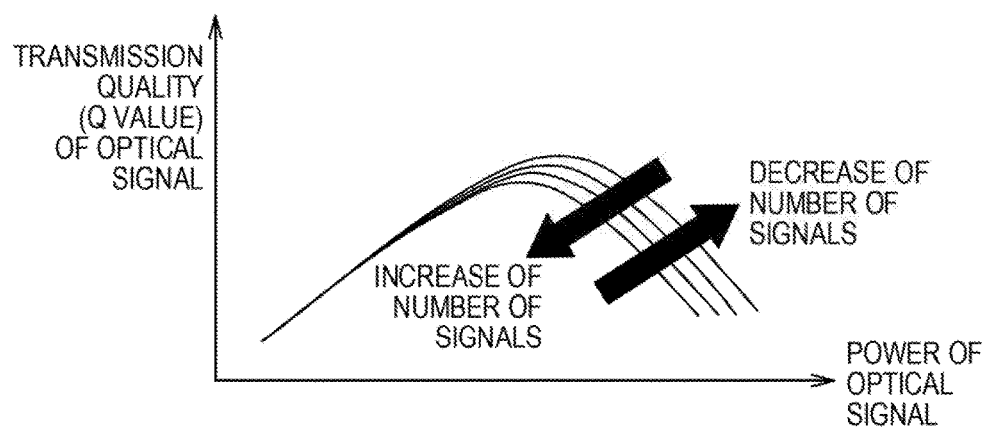
FIG. 5 is a view illustrating an example of a change of the transmission quality depending on increase/decrease of the number of signals to be wavelength-multiplexed.

FIG. 5 is a view illustrating an example of a change of the transmission quality depending on increase/decrease of the number of signals to be wavelength-multiplexed. In FIG. 5, descriptions of the matters identical to those in FIG. 4 will be omitted.

Even though the number of other optical signals to be wavelength-multiplexed with an optical signal increases or the same, for example, when the powers of the optical signals to be wavelength-multiplexed increase, the transmission characteristic of the optical signal is affected and deteriorated by the nonlinear optical effect from the optical signals. Thus, even in the region where the power is small (see the reference numeral X1 in FIG. 4), the transmission quality is deteriorated by the influence of the optical signals.

Figure 6:
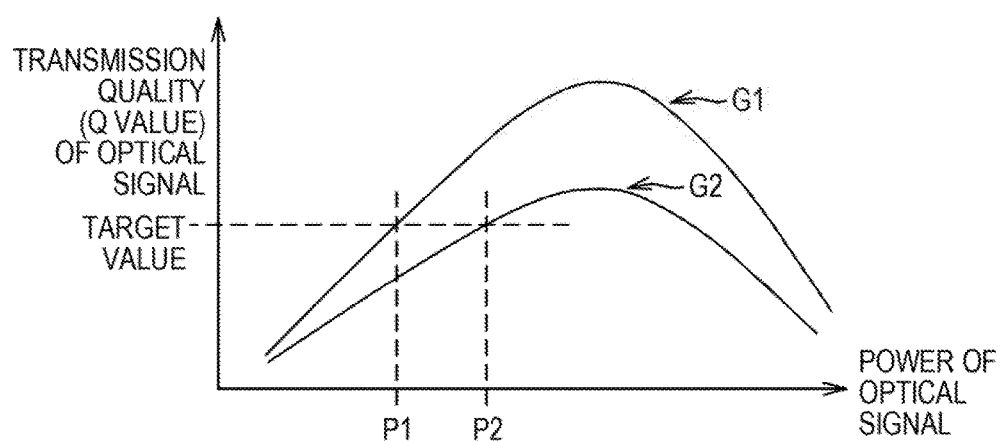
FIG. 6 is a view illustrating a change of the transmission quality depending on a transmission distance.

FIG. 6 is a view illustrating a change of the transmission quality depending on a transmission distance. In FIG. 6, descriptions of the matters identical to those in FIG. 4 will be omitted. The reference numeral G1 indicates the transmission characteristic of an optical signal having a short transmission distance, and the reference numeral G2 indicates the transmission characteristic of an optical signal having a long transmission distance.

Since the influence of the nonlinear optical effect increases as the transmission distance becomes longer, the transmission characteristic of the optical signal is deteriorated. Thus, in a case where two optical signals having different transmission distances are wavelength-multiplexed, when the transmission qualities of the optical signals are controlled to reach the same target value, the powers P1 and P2 thereat of the optical signals become different from each other. More specifically, the power P2 of the optical signal having a long transmission distance becomes larger than the power P1 of the optical signal having a short transmission distance.

For example, it is assumed that the optical network control device 1 controls the power of an optical signal based on the transmission characteristic database of the optical signal as in the related art. In this case, the transmission characteristic database needs to hold in advance the transmission characteristic when the optical signal of the power P1 and the optical signal of the power P2 are wavelength-multiplexed and transmitted. However, since the combinations of the powers P1 and P2 may be infinitely estimated, the transmission characteristic database may become large infinitely. Thus, for example, only the data calculated by assuming that the powers of the respective optical signals are the same is registered in the transmission characteristic database.

Accordingly, in the optical network control device 1 of the related art, the path design may be performed only for the case where the powers P1 and P2 are the same. Thus, the power P1 of the optical signal having a short transmission distance and the power P2 of the optical signal having a long transmission distance are set to be equal to each other. As a result, the power P1 of the optical signal having a short transmission distance may become excessively large, the influence of the nonlinear optical effect on the optical signal having a long transmission distance may become larger than that when the power P1 is controlled to be an appropriate value, and the transmission quality of the optical signal having a long transmission distance may be deteriorated.

As described above, in the path management using the transmission characteristic database of the related art, it may be difficult to perform, for example, the operation to equalize the transmission quality of the optical signals by setting different powers for the respective optical signals. Thus, the transmission quality of the optical signals may be deteriorated, and a desired transmission quality may not be obtained, as compared to the case where the transmission quality is equalized.

Thus, the optical network control device 1 of an embodiment of the present disclosure stores a change rate of the transmission quality of an optical signal of an existing path with respect to the power of the optical signal when the transmission quality is a target value, and determines from the change rate whether to set a path of another optical signal to overlap with at least a portion of the existing path. Based on the change rate of the transmission quality with respect to the power of the optical signal, the optical network control device 1 may determine whether the current transmission quality has a sufficient margin, when the optical signal is wavelength-multiplexed with other optical signals. Therefore, the optical network control device 1 may perform the determination of the path setting with high accuracy. The determination means is described below.

Figure 7:
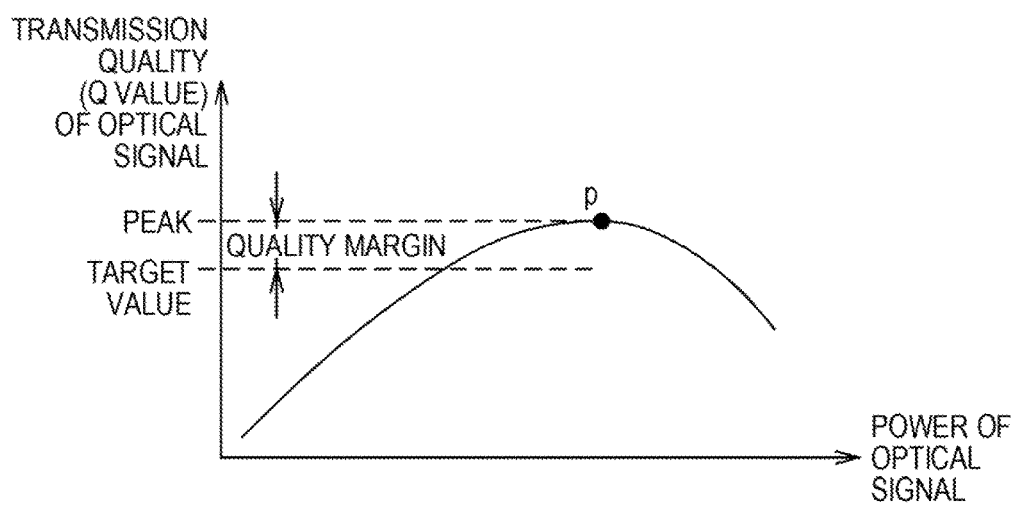
FIG. 7 is a view illustrating an example of a quality margin of an optical signal.

FIG. 7 is a view illustrating an example of a quality margin of an optical signal. In FIG. 7, descriptions of the matters identical to those in FIG. 4 will be omitted. The optical network control device 1 measures the Q value as an example of the transmission quality of an optical signal of a path. The optical network control device 1 acquires the bit error rate from the transponder 3 of the end node of the path and calculates the Q value from the bit error rate.

Equation (1)

$$Q\text{value}=20\cdot\log_{10}\{\sqrt{2}\cdot\text{erfc}^{-1}(2\cdot BER)\} \quad (1)$$

More specifically, the optical network control device 1 calculates the Q value from Equation (1) above. In Equation (1), the variable BER indicates the bit error rate. The function $\text{erfc}^{-1}$ is an inverse function of a complementary error function erfc.

Equation (2)

$$\text{erfc}(x) = \frac{2}{\sqrt{\pi}} \int_x^\infty e^{-t^2} dt \quad (2)$$

For example, the complementary error function erfc is represented with the variable x by Equation (2) above.

Figure 8:
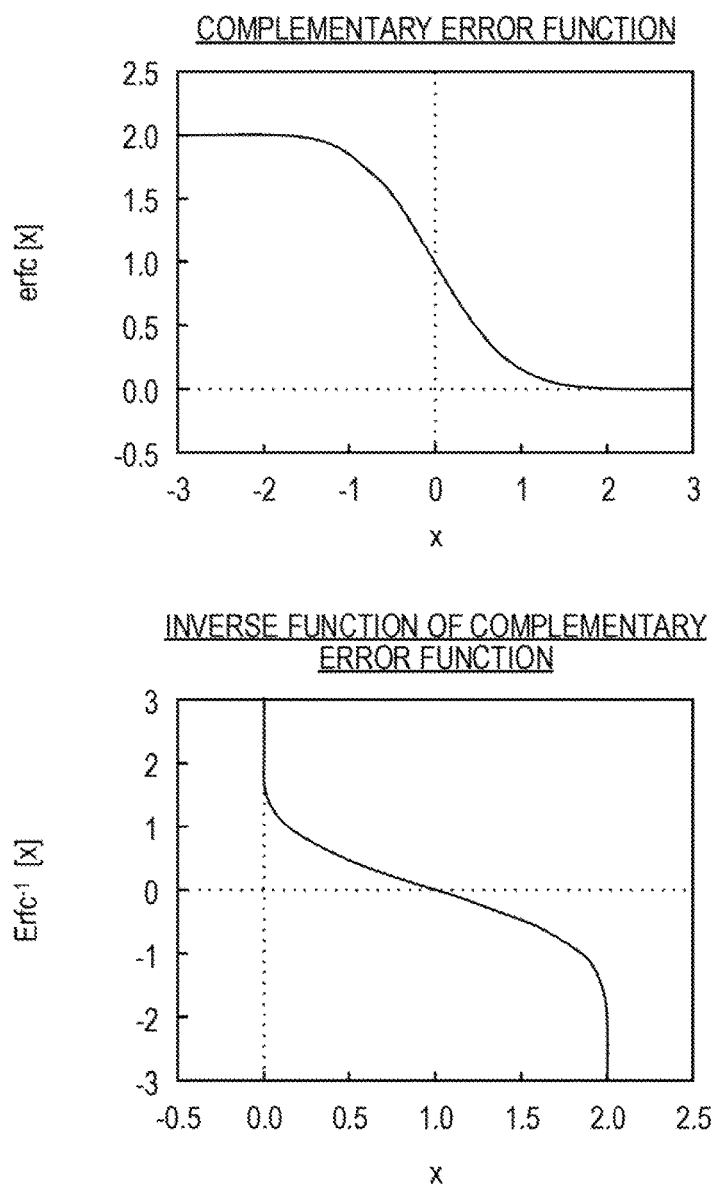
FIG. 8 illustrates graphs of a complementary error function and an inverse function of the complementary error function, respectively.

FIG. 8 illustrates graphs of the complementary error function erfc(x) and the inverse function $\text{erfc}^{-1}(x)$ of the complementary error function, respectively. In FIG. 8, the horizontal axis of each graph indicates the variable x. The optical network control device 1 statistically calculates the Q value from the bit error rate BER by using the inverse function of the complementary error function erfc.

Referring back to FIG. 7, the optical network control device 1 controls the power of the optical signal such that the Q value of the optical signal becomes a required predetermined target value. In this case, the difference between the target value of the Q value and the peak value (see the reference numeral □p□) of the transmission quality in the transmission characteristic of the optical signal (see the reference symbol □p□) is defined as a □quality margin □ indicating a range of the transmission quality that may be improved by a power adjustment when the optical signal is wavelength-multiplexed with other optical signals. In addition, the target value of the Q value is, for example, a value obtained by adding a margin determined in consideration of the deterioration due to aging to the bit error rate that the optical signal has to meet.

The optical network control device 1 performs the path setting such that paths of other optical signals overlap with a path of an optical signal having a large quality margin, and paths of other optical signals do not overlap with a path of an optical signal having a small quality margin.

Figure 9:
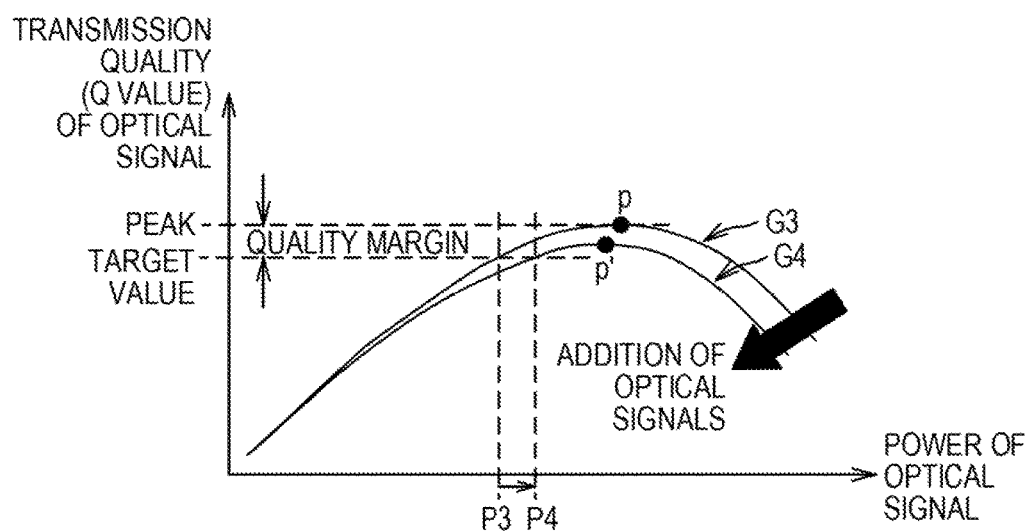
FIG. 9 is a view illustrating an example of a change of the transmission quality when an optical signal having a large quality margin is wavelength-multiplexed with other optical signals.

FIG. 9 is a view illustrating an example of a change of the transmission quality when the optical signal having a large quality margin is wavelength-multiplexed with other optical signals. In FIG. 9, description of the matters identical to those in FIG. 7 will be omitted. The reference numeral G3 indicates the transmission characteristic of the optical signal before other optical signals are wavelength-multiplexed, and the reference numeral G4 indicates the transmission characteristic of the optical signal after other optical signals are wavelength-multiplexed.

The power of the optical signal is controlled to be a predetermined value P3 corresponding to the target value before other optical signals are wavelength-multiplexed (added). However, as described above, since the transmission characteristic of the optical signal decreases after other optical signals are wavelength-multiplexed, the peak value of the Q value decreases from the value indicated by the reference symbol □p□ to the value indicated by the reference symbol □p□.□

However, since the quality margin is large, the peak value after the decrease still exceeds the target value of the Q value, like the peak value before the decrease. Thus, the optical network control device 1 may return the Q value decreased from the target value, to the target value once again by increasing the power of the optical signal from P3 to P4. That is, even when the optical signal having a large quality margin is wavelength-multiplexed with other optical signals, the target value may be maintained. In addition, controlling the power of each optical signal to be the same target value as described above is represented as □equalization□ of the transmission quality.

Figure 10:
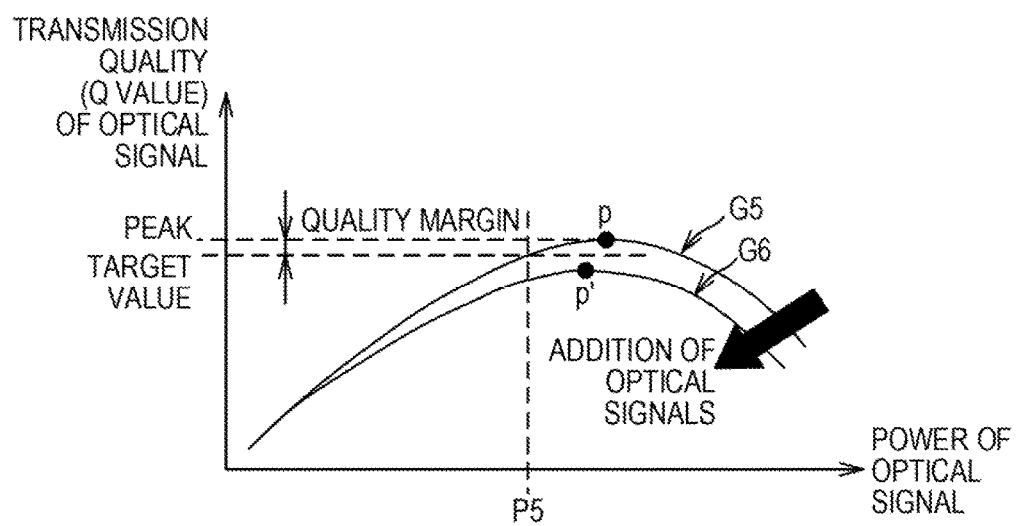
FIG. 10 is a view illustrating an example of a change of the transmission quality when an optical signal having a small quality margin is wavelength-multiplexed with other optical signals.

FIG. 10 is a view illustrating an example of a change of the transmission quality when the optical signal having a small quality margin is wavelength-multiplexed with other optical signals. In FIG. 10, description of the matters identical to those in FIG. 7 will be omitted. The reference numeral G5 indicates the transmission characteristic of the optical signal before other optical signals are wavelength-multiplexed, and the reference numeral G6 indicates the transmission characteristic of the optical signal after other optical signals are wavelength-multiplexed.

The power of the optical signal is controlled to be a predetermined value P5 corresponding to the target value before other optical signals are wavelength-multiplexed (added). However, as described above, since the transmission characteristic of the optical signal decreases after other optical signals are wavelength-multiplexed, the peak value of the transmission quality decreases from the value indicated by the reference symbol □p□ to the value indicated by the reference symbol □p□.□

In this example, since the quality margin is smaller than that in the above-described example, the decreased peak value falls below the target value, unlike the peak value before the decrease. Thus, the Q value may not reach the target value even when the power of the optical signal is increased from P5. That is, when the optical signal having a small quality margin is wavelength-multiplexed with other optical signals, the target value may not be maintained.

Thus, when performing the path setting, the optical network control device 1 determines whether a new path may be set to overlap with an existing path in the network NW, based on the quality margin of the existing path. As a result of the determination, when it is determined that a new path may not be set to overlap with the existing path, the optical network control device 1 sets the new path not to overlap with the existing path.

However, in order to measure the quality margin, the optical network control device 1 increases the power of the optical signal up to the region where the power exceeds the peak p in the transmission characteristic (see the region X2 in FIG. 4). In this case, since the influence of the nonlinear optical effect on an optical signal of an existing path, other than the path of which power of the optical signal has been increased, increases, the Q value of the optical signal of the existing path decreases during the measurement of the quality margin. In this case, the communication on the existing path is affected. Thus, the quality margin may not be directly measured in the optical network that is being operated.

Accordingly, instead of measuring the quality margin, the optical network control device 1 calculates a change rate of the Q value with respect to the power when the Q value reaches the target value. In the transmission characteristic of the optical signal, the Q value is represented as a graph which is upwardly convex with respect to the power. Thus, the change rate of the Q value decreases as the Q value approaches the value of the peak p, and increases as the Q value becomes far away from the value of the peak p. Thus, the change rate of the Q value decreases as the quality margin is small, and increases as the quality margin is large. A method of calculating the change rate of the Q value is described below.

Figure 11:
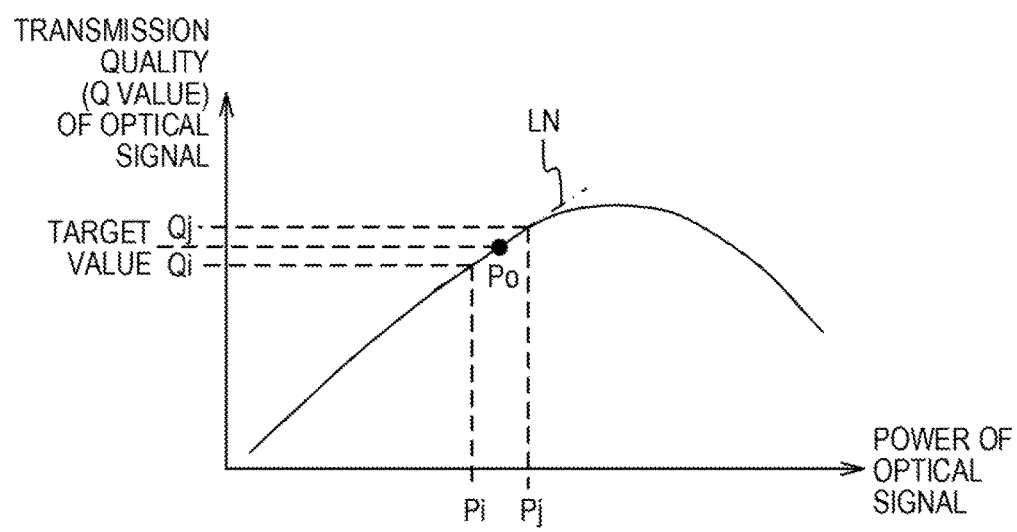
FIG. 11 is a view illustrating an example of a change rate of a Q value.

FIG. 11 is a view illustrating an example of the change rate of the Q value. In FIG. 11, descriptions of the matters common to those in FIG. 7 will be omitted. The optical network control device 1 calculates the change rate of the Q value in the process of equalizing the transmission quality of the optical signal. The optical network control device 1 does not necessarily make the transmission quality equal to the target value by the equalization. The optical network control device 1 increases the power with a predetermined pitch width and completes the equalization at the time when the Q value exceeds the target value.

In this example, it is assumed that the Q value of the optical signal exceeds the target value when the power increases from a predetermined value $P_i$ to a predetermined value $P_j$ ($>P_i$). In this case, the Q value corresponding to the power $P_i$ is $Q_i$, and the Q value corresponding to the power $P_j$ is $Q_j$. At this time, with respect to the Q value, the relationship of $Q_i <$ target value $< Q_j$ is established.

Equation (3)

$$\text{Change rate of } Q\text{value} = (Q_j - Q_i)/(P_j - P_i) \qquad (3)$$

The optical network control device 1 calculates the change rate of the Q value according to, for example, Equation (3) above. Here, Pj-Pi corresponds to the pitch width in the control of the power and is determined according to, for example, the resolution of the attenuation factor of the optical attenuator 22 of the ROADM 2.

The change rate of the Q value calculated as described above corresponds to the inclination of the tangent line LN passing through the point Po where the Q value=the target value, in the graph of the transmission characteristic. In the descriptions below, the change rate of the Q value will be represented as the □inclination of the Q value.□

The optical network control device 1 calculates the inclination of the Q value by the equalization of the transmission quality and stores the inclination of the Q value in a memory or the like. Then, when setting a new path, the optical network control device 1 determines whether the new path may be set to overlap with an existing path, based on the inclination of the Q value of the existing path. The configuration of the optical network control device 1 is described below.

Figure 12:
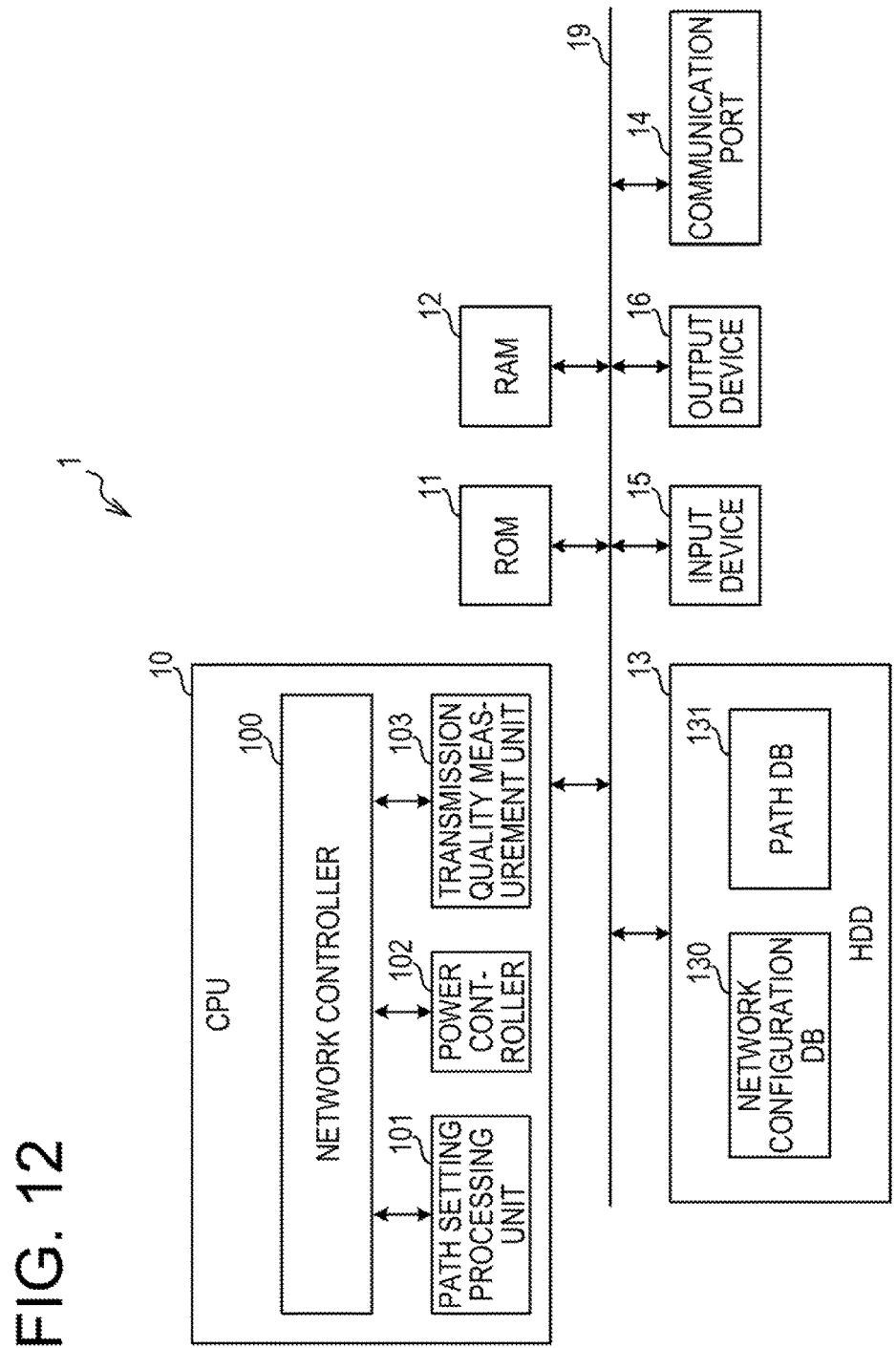
FIG. 12 is a view illustrating an example of an optical network control device.

FIG. 12 is a configuration diagram illustrating an example of the optical network control device 1. The optical network control device 1 includes a CPU 10, a ROM 11, a RAM 12, an HDD 13, a communication port 14, an input device 15, and an output device 16. The CPU 10 is connected to the ROM 11, the RAM 12, the HDD 13, the communication port 14, the input device 15, and the output device 16 via a bus 19 so as to enable input/output of a signal among the components. The CPU 10 is an example of a computer.

The ROM 11 stores a program for driving the CPU 10. This program includes an operating system (OS) and a network management program for executing the network management method of the embodiment. The RAM 12 functions as a working memory of the CPU 10. The communication port 14 is, for example, a wireless local area network (LAN) card or a network interface card (NIC), and communicates with the ROADM 2 and the transponder 3.

The input device 15 inputs information to the optical network control device 1. Examples of the input device 15 include a keyboard, a mouse, a touch panel and others. The input device 15 outputs the input information to the CPU 10 via the bus 19.

The output device 16 outputs the information of the optical network control device 1. Examples of the output device 16 include a display, a touch panel, a printer and others. The output device 16 acquires and outputs information from the CPU 10 via the bus 19.

The CPU 10 is an example of a computer, and when the program is read from the ROM 11, a network controller 100, a path setting processing unit 101, a power controller 102, and a transmission quality measurement unit 103 are formed as functions. In addition, the HDD 13 stores a network configuration database (DB) 130 and a path database (DB) 131.

In the network configuration DB 130, information on the configuration of the network NW is registered. In the path DB 131, information on an existing path is registered.

FIG. 13 is a view illustrating an example of the network configuration DB 130 and the path DB 131. In the network configuration DB 130, a link ID, connection node IDs, and usable/unusable state information are registered.

The link ID indicates an identifier (#1, #2, . . . ) of each link L in the network NW. The connection node IDs indicate identifiers of a pair of nodes, from the nodes #1 to #6, to which the link L indicated by the link ID is connected. For example, when the link L is connected between the nodes #2 and #3, the connection node IDs are #2 and #3.

The □usable/unusable state□ information indicates the usable/unusable state for using the corresponding link L as a portion of a path. The □usable/unusable state□ information is set to □usable□ in the initial state, and set to □unusable□ when the Q value does not reach the target value in the equalization of the transmission quality.

In the path DB 131, a path ID, passing node IDs, the power, the inclination of the Q value, a backup value of the power (refer to □backup□), and a backup value of the inclination of the Q value (refer to □precautionary□) are registered. The path ID indicates an identifier of an existing path (indicating the path Ra of FIG. 1 in this example), and the passing node IDs indicate identifiers of nodes through which the existing path passes. For example, when the path Ra passes through the nodes #3 to #6, □#3 to #6□ are registered in the passing node IDs.

The power indicates a value of the power when the equalization of the transmission quality is completed. The inclination of the Q value indicates a value of the inclination of the Q value when the equalization of the transmission quality is completed. The backup values of the power and the inclination of the Q value are used to provide against the event where a new path may not be set as a result of the change of the power and the inclination of the Q value in the process of equalizing the transmission quality, and maintain the values of the power and the inclination of the Q value before the change.

As described above, the HDD 13, as a portion of a storage unit, stores the inclination of the Q value for each path. The storage unit is not limited to the HDD 13, and a memory may be used.

Referring back to FIG. 12, the network controller 100 controls the operation of the optical network control device 1 and instructs the path setting processor 101, the power controller 102, and the transmission quality measurement unit 103 to perform their operations.

The path setting processing unit 101 sets a path in the network NW, according to an instruction from the network controller 100. The network controller 100 receives input of information on the start node, end node, wavelength, band and others of the path from the input device 15. From the information, the network controller 100 generates and outputs instruction information for the path setting processing unit 101.

The path setting processing unit 101 calculates the route of the path by, for example, the shortest distance method. At this time, the path setting processing unit 101 calculates the route by selecting a link based on a metric of each link, that is, a distance of each link such as the number of hops. The path setting processing unit 101 sets the metric of each link based on the link length in calculating the route. The metric is selection priority in the path setting.

After setting the metric with the link length, the path setting processing unit 101 acquires the inclination of the Q value of an existing path from the path DB 131 and detects an existing path of which inclination of the Q value is equal to or less than a predetermined threshold TH. The path setting processing unit 101 sets the metric of each link included in the detected existing path to a value larger than that of the other links. Thus, the selection priority of each link included in the detected existing path at the time of the path setting is set to a value lower than that of the other links.

Thus, the path setting processing unit 101 causes the existing path of which inclination of the Q value is equal to or less than the predetermined threshold TH not to be used for the calculation of the route of the new path. That is, when the inclination of the Q value of the existing path is equal to or less than the predetermined threshold TH, the path setting processing unit 101, as an example of a setting processing unit, sets the metrics of one or more links included in the existing path to be larger than those of the other links so as to set the new path not to overlap with the existing path.

Since the path setting processing unit 101 may set the new path not to overlap with the path of the optical signal having a small quality margin, the path setting processing unit 101 may set the new path while maintaining the Q value of the existing path at the target value. In addition, the existing path is an example of a first path, and the new path is an example of a second path.

In this way, from the inclination of the Q value, the path setting processing unit 101 determines whether to set the new path to overlap with at least a portion of the route of the existing path. More specifically, the path setting processing unit 101 determines whether the new path may be set to overlap with the existing path, by comparing the inclination of the Q value of each existing path stored in the HDD 13 and the predetermined threshold TH with each other.

As described above, the inclination of the Q value of each path becomes an index value of the size of the quality margin of the path. Thus, by measuring the inclination of the Q value, the optical network control device 1 may detect the transmission characteristic of the path according to other optical signals wavelength-multiplexed with the optical signal with high accuracy, even when deviations of transmission characteristics and differences of vendors exist in the ROADMs 2 and the transponders 3. Therefore, the path setting processing unit 101 may perform the determination of the path design with high accuracy based on the inclination of the Q value. Thus, the equalization of the transmission quality may be effectively performed by selecting a path of which transmission quality may be easily equalized, and paths which may achieve the desired transmission quality may be increased in the entire optical network.

The path setting processing unit 101 sets the new path in the network NW according to the result of the above-described determination. Thus, the path setting processing unit 101 may appropriately set the new path according to the inclination of the Q value of the optical signal of the existing path.

Further, the power controller 102 controls the power of the optical signal of each path in the network NW, according to an instruction from the network controller 100. The network controller 100 instructs the power controller 102 to increase the power for each predetermined pitch width in equalizing the transmission quality. The power controller 102 controls the power of the optical signal in each link included in the path, by communicating with the node controller 20 of the ROADM 2 and the transponder controller 30 of the transponder 3 via the communication port 14.

Further, the transmission quality measurement unit 103 measures the Q value of the optical signal of each path, according to an instruction from the network controller 100. The network controller 100 instructs the transmission quality measurement unit 103 to perform the measurement each time the power of the optical signal is increased, in equalizing the transmission quality. The power controller 102 receives the notification of the bit error rate by communicating with the transponder controller 30 of the transponder 3 of the end node of each path via the communication port 14, and calculates the Q value from the bit error rate by Equation (1) above. In addition, the power controller 102 is an example of a controller, and the transmission quality measurement unit 103 is an example of a measurement unit.

In equalizing the transmission quality, the network controller 100 calculates the inclination of the Q value from Equation (3) above based on the Q value measured by the transmission quality measurement unit 103. More specifically, when the power controller 102 increases the power of the optical signal, the network controller 100 stores the powers Pi and Pj before and after the increase and the values Qi and Qj as Q values corresponding to the powers Pi and Pj, and calculates the inclination of the Q value from Equation (3).

In a case where the power of the optical signal of the new path is increased, when the Q value of the optical signal of the existing path measured by the transmission quality measurement unit 103 falls below the target value, the power controller 102 increases the power of the optical signal of the existing path. More specifically, in equalizing the transmission quality, the power controller 102 increases the power of the optical signal of the existing path of which transmission characteristic has been deteriorated by the addition of the new path as described above with reference to FIG. 9, according to the target value of the Q value. As a result, the Q value of the optical signal of the existing path is maintained at the target value.

In a case where the power of the optical signal of the existing path is increased, when the Q value of the optical signal of another existing path measured by the transmission quality measurement unit 103 falls below the target value, the power controller 102 increases the power of the optical signal of the another existing path. More specifically, in equalizing the transmission quality, when the increase of the power of the optical signal of the existing path has deteriorated the transmission characteristic of another existing path, the power controller 102 increases the power of the optical signal of the another existing path according to the target value of the Q value. As a result, the Q value of the optical signal of the another existing path is maintained at the target value.

Further, in a case where the power controller 102 increases the power of the optical signal of the new path, when the Q value of the optical signal of the new path measured by the transmission quality measurement unit 103 decreases, the path setting processing unit 101 deletes the new path. More specifically, in equalizing the transmission quality, in a case where the power of the optical signal of the new path is increased according to the target value of the Q value, when the Q value decreases, the network controller 100 determines that the control point of the power exceeds the peak p and reaches the uncontrollable region X2 (see FIG. 4). At this time, the network controller 100 requests the path setting processing unit 101 to delete the new path, and the path setting processing unit 101 deletes the new path in response to the request.

Thus, even when the new path is set to overlap with the existing path based on the inclination of the Q value (e.g., when the inclination of the Q value>TH), the optical network control device 1 may detect that the Q value of the new path does not reach the target value and delete the setting of the new path, in equalizing the transmission quality.

In addition, in a case where the power controller 102 increases the power of the optical signal of the existing path, when the Q value of the optical signal of the existing path measured by the transmission quality measurement unit 103 reaches the target value, the network controller 100 updates the inclination of the Q value stored in the HDD 13. Thus, when the equalization of the transmission quality is completed, the optical network control device 1 may prepare for the setting of a next new path by updating the inclination of the Q value according to the changed power of the optical signal of the existing path. In addition, the network controller 100 is an example of an updating unit.

When a plurality of existing paths exists, the power controller 102 increases the power of the optical signal of each existing path in an ascending order of the inclination of the Q value. Thus, in an order starting from the existing path of the optical signal having a smaller quality margin, the optical network control device 1 may determine whether the Q value of the existing path reaches the target value. Therefore, the optical network control device 1 may detect early an existing path of which Q value may not reach the target value, so as to expedite the timing for performing the calculation of the route of the new path again.

Figure 14A:
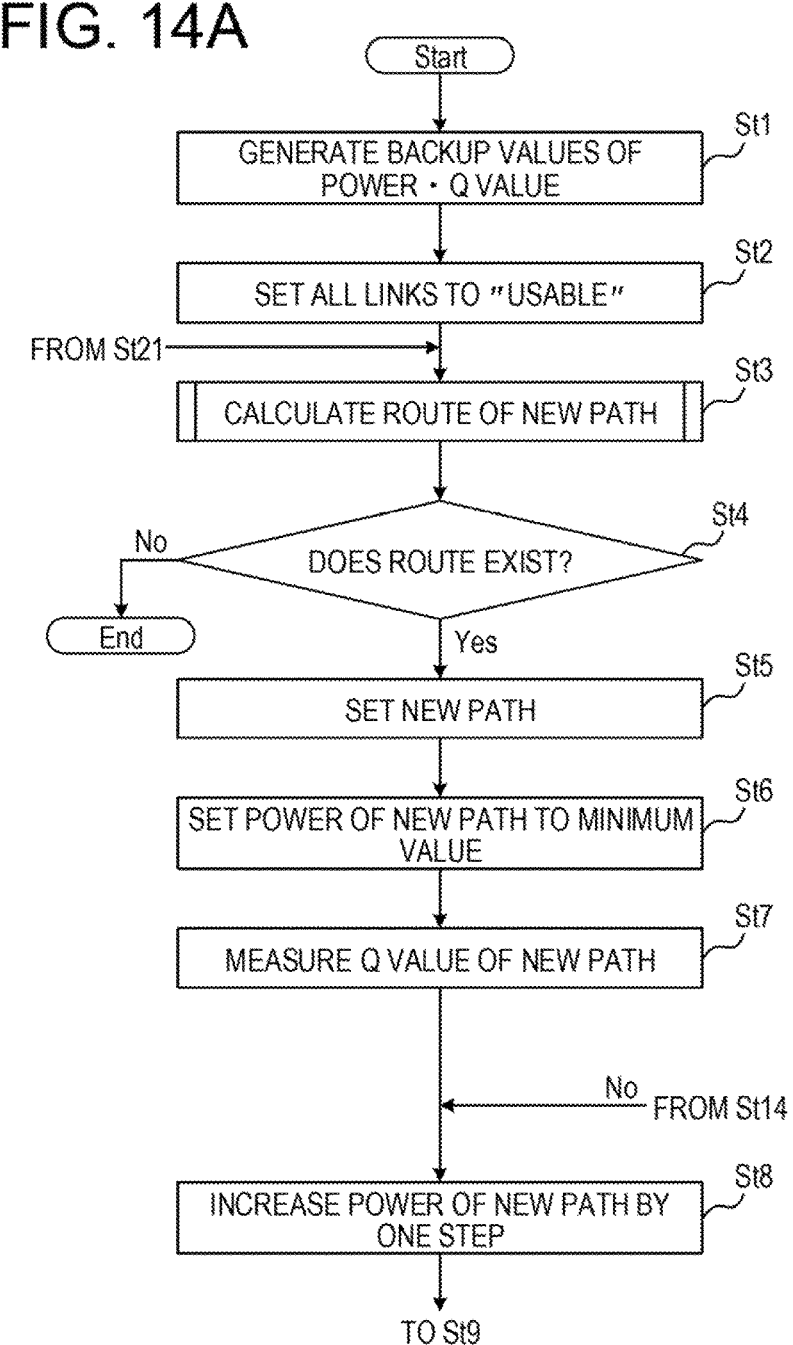
FIGS. 14A and 14B are a flowchart illustrating an exemplary operation of the optical network control device.
Figure 14B:
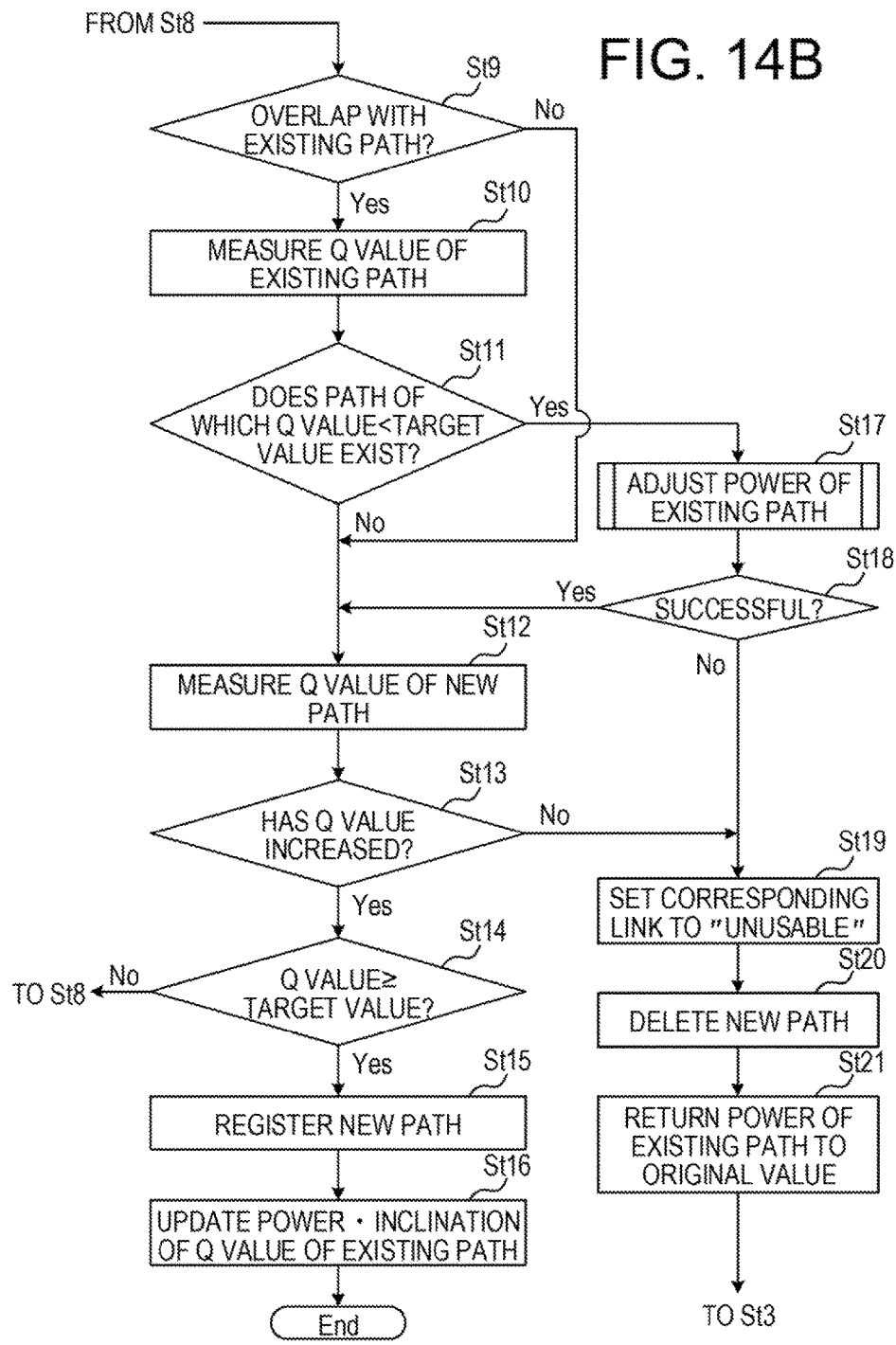

FIGS. 14A and 14B are a flowchart illustrating an exemplary operation of the optical network control device 1. This operation is performed when a request for the setting of the new path is input from the input device 15.

The network controller 100 generates backup values of the powers and the Q values of the respective existing paths in the path DB 131 (operation St1). More specifically, the network controller 100 registers the powers and the Q values of the respective existing paths registered in the path DB 131, in the backup values of the powers and the Q values, respectively. Thus, when the setting of the new path is deleted, the network controller 100 may return the powers and the Q values of the respective existing paths that have been changed in the process of equalizing the transmission quality, to the original values based on the backup values of the powers and the Q values. In addition, when no existing path is registered in the path DB 131, the network controller 100 does not perform this process.

Next, the network controller 100 sets the □usable/unusable state□ information of each link in the network configuration DB 130 to □usable□ (operation St2). Accordingly, the network controller 100 initializes all the links to be in the state of being usable for the calculation of the route.

Next, the path setting processing unit 101 calculates the route of the new path, according to an instruction from the network controller 100 (operation St3). The process of calculating the route of the new path will be described later.

Next, the path setting processing unit 101 determines whether a route is present, from the result of the calculation of the route of the new path (operation St4). When it is determined that no route exists (□No□ in operation St4), the network controller 100 ends the process. When it is determined that a route exists (□Yes□ in operation St4), the path setting processing unit 101 sets the new path in the network NW according to the result of the calculation of the route (operation St5). At this time, the path setting processing unit 101 sets a path having a predetermined wavelength for the ROADMs 2 and the transponders 3 of the nodes #1 to #6 through which the new path passes.

Next, the power controller 102 sets the power of the optical signal of the new path to the minimum value, according to an instruction from the network controller 100 (operation St6). At this time, the power controller 102 sets the power of the optical signal of the new path to the minimum value, for the ROADMs 2 and the transponders 3 of the respective nodes #1 to #6 through which the new path passes. The minimum value of the power is determined according to, for example, the performance of the pre-amplifier 26 of the ROADM 2 or the wavelength tunable laser device 32 of the transponder 3.

Next, the transmission quality measurement unit 103 measures the Q value of the optical signal of the new path, according to an instruction from the network controller 100 (operation St7). At this time, the transmission quality measurement unit 103 acquires the bit error rate of the optical signal of the new path from the transponder 3 of the end node of the nodes #1 to #6 of the new path, and calculates the Q value from Equation (1) above.

Next, the power controller 102 increases the power of the optical signal of the new path by one step, according to an instruction from the network controller 100 (operation St8). At this time, the power controller 102 sets the power of the optical signal of the new path to increase by the pitch width, for the ROADMs 2 and the transponders 3 of the respective nodes #1 to #6 through which the new path passes.

Next, based on the network configuration DB 130, the network controller 100 determines whether at least a portion of the links L included in the existing paths and the links L included in the new path overlap with each other (operation St9). When it is determined that the links L of the existing paths and the links L of the new path do not overlap with each other (□No□ in operation St9), the process of operation St12 to be described later is performed.

When it is determined that the links L of the existing paths and the links L of the new path overlap with each other (□Yes□ in operation St9), the transmission quality measurement unit 103 measures the Q values of the overlapping existing paths according to an instruction from the network controller 100 (operation St10). At this time, the transmission quality measurement unit 103 acquires the bit error rate of the optical signal of a corresponding existing path from the transponder 3 of the end node of the nodes #1 to #6 of the corresponding existing path, and calculates the Q value from Equation (1) above.

Next, the network controller 100 determines whether there exists a path of which Q value falls below the target value due to the increase of the power in operation St8, among the existing paths of which lines L overlap with those of the new path (operation St11). When it is determined that there exists no path of which Q value falls below the target value (□No□ in operation St11), the process of operation St12 to be described later is performed.

When it is determined that there exists a path of which Q value falls below the target value (□Yes□ in operation St11), the power controller 102 adjusts the power of the optical signal of the corresponding existing path such that the Q value becomes the target value, according to an instruction from the network controller 100 (operation St17). That is, the transmission quality measurement unit 103 equalizes the transmission quality of the optical signal of the existing path. The process of adjusting the power will be described later.

Next, the network controller 100 determines whether the power adjustment of the optical signal of the corresponding existing path is successful (operation St18). More specifically, when the power could be adjusted such that the Q value of the optical signal of the existing path becomes the target value, the network controller 100 determines that the adjustment is successful, and when the power could not be adjusted such that the Q value of the optical signal of the existing path becomes the target value, the network controller 100 determines that the adjustment is failed. For example, when the optical signal of the existing path has a large quality margin (see FIG. 9), the Q value may become the target value by the power adjustment. However, when the optical signal of the existing path has a small quality margin (see FIG. 10), the Q value may not become the target value by the power adjustment.

When it is determined that the power adjustment is failed (□No□ in operation St18), the network controller 100 sets the □usable/unusable state□ information in the network configuration DB 130 to □unusable,□ for each link L included in the existing path (operation St19). Thus, the links L are not used as a portion of the new path when calculating the route of the new path again (operation St3).

Next, the path setting processing unit 101 deletes the new path according to an instruction from the network controller 100 (operation St20). At this time, the path setting processing unit 101 deletes the setting of the path having a predetermined wavelength in the ROADMs 2 and the transponders 3 of the nodes #1 to #6 through which the new path passes.

Next, the network controller 100 returns the power of the optical signal of each existing path to the backup value of the power registered in the path DB 131 (operation St21). Then, the path setting processing unit 101 calculates the route of the new path again (operation St3).

When it is determined that the power adjustment is successful (□Yes□ in operation St18), the transmission quality measurement unit 103 measures the Q value of the optical signal of the new path according to an instruction of the network controller 100 (operation St12). Next, the network controller 100 determines whether the Q value has increased, as compared to that before the power of the optical signal is increased (operation St13). More specifically, the network controller 100 compares the Q value measured in the previous process (operation St7 or St12) and the Q value newly measured in the process of operation St12 with each other, so as to determine whether the control point of the power is present in the region X1 or X 2, in the transmission characteristic illustrated in FIG. 4.

When it is determined that the Q value has decreased (□No□ in operation St13), the network controller 100 determines that the control point of the power is present in the region X2, and sets the □usable/unusable state□ information in the network configuration DB 130 to □unusable,□ for each link L included in the new path (operation St19). Thus, the links L of the new path are not used as a portion of the new path when calculating the route of the new path again (operation St3).

Next, the path setting processing unit 101 deletes the new path according to an instruction from the network controller 100 (operation St20).

As described above, in a case where the power controller 102 increases the power of the optical signal of the new path, when it is determined that the Q value of the optical signal of the new path measured by the transmission quality measurement unit 103 has decreased (□No□ in operation St13), the path setting processing unit 101 deletes the new path. Thus, even when the new path is set to overlap with the existing path (that is, when the inclination of the Q value>TH) based on the inclination of the Q value, the optical network control device 1 may detect that the Q value of the new path does not reach the target value and delete the setting of the new path, in equalizing the transmission quality.

Next, the network controller 100 returns the power of the optical signal of each existing path to the backup value of the power registered in the path DB 131 (operation St21). Then, the path setting processing unit 101 calculates the route of the new path again (operation St3).

In addition, when it is determined that the Q value has increased (□Yes□ in operation St13), the network controller 100 determines that the control point of the power is present in the region X1 and compares the Q value with the target value (operation St14). When it is determined that the Q value has not reached the target value (□No□ in operation St14), the network controller 100 increases the power of the new path by one step (operation St8). Then, the process following operation St9 is performed again.

When it is determined that the Q value has reached the target value (□Yes" in operation St14), the network controller 100 registers the new path in the path DB (operation St15). At this time, the network controller 100 calculates the inclination of the Q value from Equation (3). As a result, the passing node IDs, the power, and the inclination of the Q value of the new path are registered in the path DB.

Next, the network controller 100 updates the power and the inclination of the Q value of the optical signal of the existing path to the adjusted power and inclination of the Q value, respectively (operation St16). At this time, the network controller 100 calculates the inclination of the Q value of the existing path Ra. This process is not performed when the power adjustment of the optical signal of the existing path (operation St17) is not performed.

In this way, in a case where the power controller 102 increases the power of the optical signal of the existing path, when the Q value of the optical signal of the existing path measured by the transmission quality measurement unit 103 has reached the target value, that is, when it is determined that the power adjustment of the existing path is successful (□Yes□ in operation St18), the network controller 100 updates the inclination of the Q value stored in the HDD 13. Thus, when the equalization of the transmission quality is completed, the optical network control device 1 may prepare for the setting of the next new path by updating the inclination of the Q value according to the changed power of the optical signal of the existing path. The optical network control device 1 operates in this way.

Figure 15:
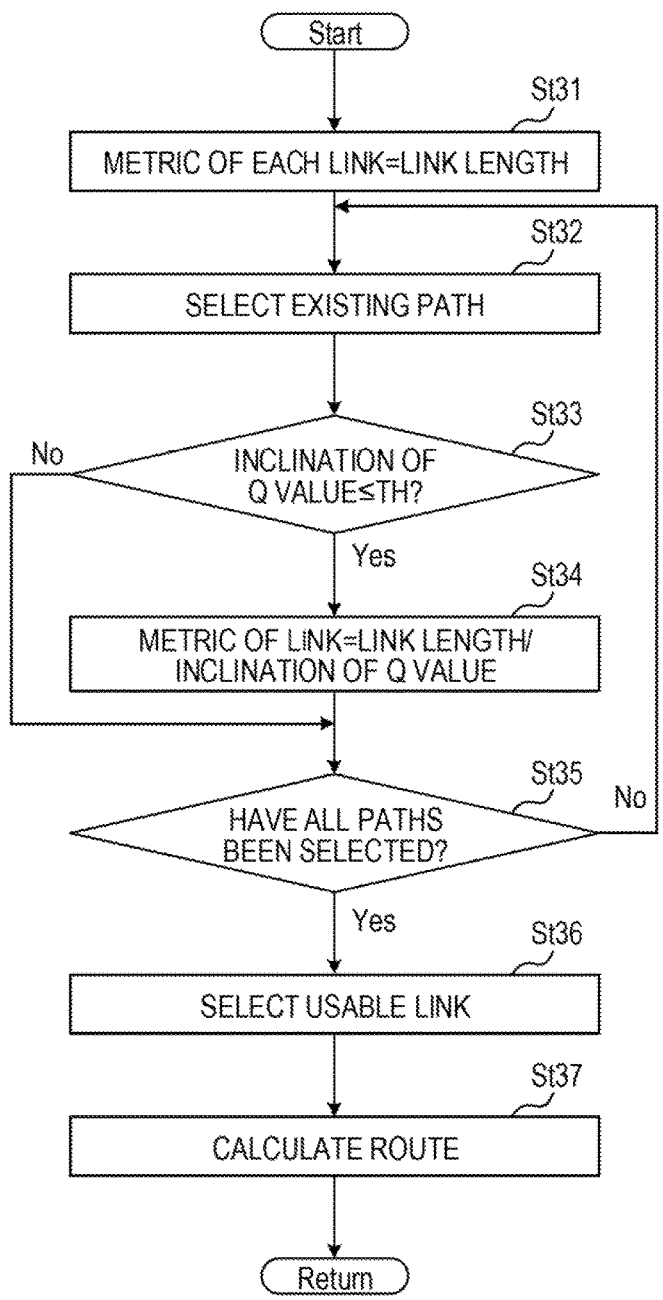
FIG. 15 is a flowchart illustrating an example of a process of calculating a route of a new path.

FIG. 15 is a flowchart illustrating an example of the process of calculating the route of the new path. This process is performed in operation St3 of FIG. 14A.

The path setting processing unit 101 sets the metric of each link L with the link length (operation St31). Next, the path setting processing unit 101 selects one of the existing paths registered in the path DB (operation St32). Next, the path setting processing unit 101 compares the inclination of the Q value in the path DB with a predetermined threshold TH (operation St33). The threshold TH is predetermined based on, for example, the transmission characteristic of the optical signal illustrated in FIG. 4.

When it is determined that the inclination of the Q value is equal to or less than the threshold TH (□Yes□ in operation St33), the path setting processing unit 101 changes the metric of the corresponding link L to the inclination of the link length/the Q value (operation St34). Thus, the metric of the link L increases as the inclination of the Q value decreases. In addition, when it is determined that the inclination of the Q value is larger than the threshold TH (□No□ in operation St33), the path setting processing unit 101 does not perform the process of operation St34.

Next, the path setting processing unit 101 determines whether all the existing paths in the path DB have been selected (operation St35). When it is determined that there exists an unselected existing path (□No□ in operation St35), the path setting processing unit 101 selects the unselected existing path (operation St 32) and performs the process following operation St33 again.

When it is determined that all the existing paths have been set (□Yes□ in operation St35), the path setting processing unit 101 selects a link L of which the usable/unusable state information indicates usable, based on the network configuration DB 130 (operation St36). Thus, the path setting processing unit 101 does not select a link L of which the usable/unusable state information is set to unusable as a result of the process of operation St19.

Next, the path setting processing unit 101 calculates the route of the new path by the shortest distance method, for example, using the metric of each selected link L (operation St37). At this time, since the metric of the link L of the existing path of which the inclination of the Q value is equal to or less than the threshold TH has been increased by the process of operation St34, the path setting processing unit 101 does not select the corresponding link L. Thus, the path setting processing unit 101 calculates the route of the new path not to overlap with the route of the existing path of which the inclination of the Q value is equal to or less than the threshold TH. The process of calculating the route of the new path is performed in this way.

As described above, the path setting processing unit 101 determines whether to set the new path of the optical signal to overlap with at least a portion of the existing path, from the inclination of the Q value by the process of operation St33. Thus, the path setting processing unit 101 may perform the determination of the path design with high accuracy based on the inclination of the Q value.

Further, the path setting processing unit 101 sets the new path in the network NW according to the result of the determination in the process of operation St5 described above. Thus, the path setting processing unit 101 may appropriately set the new path according to the inclination of the Q value of the optical signal of the existing path.

More specifically, when the inclination of the Q value of the existing path is equal to or less than the predetermined threshold TH, the path setting processing unit 101 sets the metrics of one or more links included in the existing path to be larger than those of the other links, in the process of operation St34, so as to set the new path not to overlap with the route of the existing path. Since the path setting processing unit 101 may set the new path not to overlap with the path of the optical signal having a small quality margin, the path setting processing unit 101 may set the new path while maintaining the Q value of the existing path at the target value.

Figure 16B:
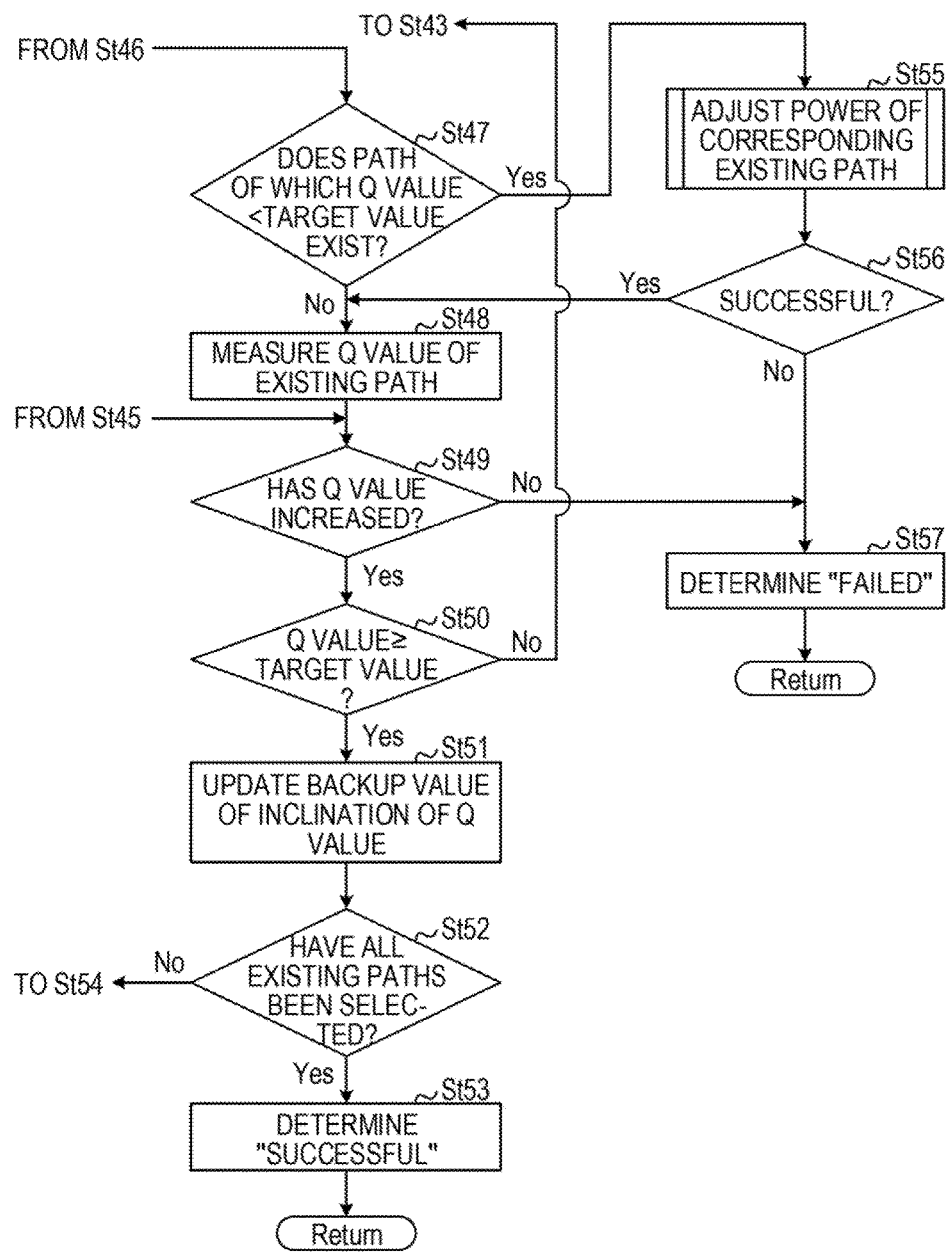

FIGS. 16A and 16B are a flowchart illustrating an example of the process of adjusting the power of the existing path. This process is performed in operation St17 of FIG. 14B.

The network controller 100 selects an existing path having the smallest inclination of the Q value from the path DB 131 (operation St41). Next, the transmission quality measurement unit 103 measures the Q value of the optical signal of the selected existing path according to an instruction of the network controller 100 (operation St42).

Next, the power controller 102 increases the power of the optical signal of the existing path by one step according to an instruction of the network controller 100 (operation St43). Next, the network controller 100 updates the backup value of the power of the existing path in the path DB 131 (operation St44). Next, the network controller 100 determines whether at least a portion of the links L included in the selected existing path overlaps with the links L included in the other existing paths (operation St45).

When it is determined that the selected existing path does not overlap with the other existing paths (No in operation St45), the process of operation St49 to be described later is performed. When it is determined that the selected existing path overlaps with the other existing paths (Yes in operation St45), the transmission quality measurement unit 103 measures the Q values of the overlapping other existing paths according to an instruction from the network controller 100 (operation St46). Next, the network controller 100 determines whether there exists a path of which Q value falls below the target value due to the increase of the power in operation St43, among the overlapping other existing paths (operation St47). When it is determined that there exists no path of which Q value falls below the target value (No in operation St47), the process of operation St48 to be described later is performed.

Meanwhile, when it is determined that there exists a path of which Q value falls below the target value (Yes in operation St47), the power controller 102 adjusts the power of the optical signal of the corresponding existing path such that the Q value becomes the target value (operation St55). That is, the transmission quality measurement unit 103 equalizes the transmission quality of the optical signal of the existing path. In this process, the process illustrated in FIGS. 16A and 16B is further performed for the corresponding existing path.

As described above, in a case where the power of the optical signal of the existing path is increased, when the Q value of the optical signal of another existing path measured by the transmission quality measurement unit 103 falls below the target value, the power controller 102 increases the power of the optical signal of the another existing path. More specifically, in equalizing the transmission quality, when the increase of the power of the optical signal of the existing path has deteriorated the transmission characteristic of another existing path, the power controller 102 increases the power of the optical signal of the another existing path according to the target value of the Q value. Thus, the Q value of the optical signal of the another existing path is maintained at the target value.

Next, the network controller 100 determines whether the power adjustment of the optical signal of the corresponding existing path is successful (operation St56). More specifically, when the power could be adjusted such that the Q value of the optical signal of the existing path becomes the target value, the network controller 100 determines that the adjustment is successful, and when the power could not be adjusted such that the Q value of the optical signal of the existing path becomes the target value, the network controller 100 determines that the adjustment is failed. For example, when the optical signal of the existing path has a large quality margin (see FIG. 9), the Q value may become the target value by the power adjustment. However, when the optical signal of the existing path has a small quality margin (see FIG. 10), the Q value may not become the target value by the power adjustment.

When it is determined that the power adjustment is failed (No in operation St56), the network controller 100 determines that the process of adjusting the power of the existing path is failed (operation St57) and ends the process. This determination result is used in the process of operation St18 in FIG. 14B.

When it is determined that the power adjustment is successful (Yes in operation St56) or when it is determined that there exists no path of which Q value falls below the target value (No in operation St47), the transmission quality measurement unit 103 measures the Q value of the optical signal of the selected existing path according to an instruction from the network controller 100 (operation St48). Next, the network controller 100 determines whether the Q value has increased, as compared with that before the power of the optical signal is increased (operation St49). More specifically, the network controller 100 compares the Q value measured in the previous process (operation St42 or St48) and the Q value newly measured in the process of operation St48 with each other, so as to determine whether the control point of the power is present in the region X1 or X2 in the transmission characteristic of the optical signal illustrated in FIG. 4.

When it is determined that the Q value has decreased (□No□ in operation St49), the network controller 100 determines that the control point of the power is present in the region X2, determines that the power adjustment is failed (operation St57), and ends the process.

When it is determined that the Q value has increased (□Yes□ in operation St49), the network controller 100 determines that the control point of the power is present in the region X1 and compares the Q value with the target value (operation St50). When it is determined that the Q value has not reached the target value (□No□ in operation St50), the network controller 100 increases the power of the selected existing path by one step (operation St43). Then, the process following operation St44 is performed again.

In addition, when it is determined that the Q value has reached the target value (□Yes□ in operation St50), the network controller 100 updates the backup value of the inclination of the Q value of the selected existing path in the path DB 131 (operation St51).

Next, the network controller 100 determines whether all the existing paths overlapping with the new path have been selected (operation St52). When it is determined that all the existing paths have been selected (□Yes□ in operation St52), the network controller 100 determines that the power adjustment is successful (operation St53) and ends the process.

In addition, when it is determined that there exists an unselected existing path (□No□ in operation St52), the network controller 100 selects an existing path having the second smallest inclination of the Q value (operation St54) and performs the process following operation St42 on the existing path again.

In this way, when a plurality of existing paths exist, the power controller 102 increases the power of the optical signal of each existing path in the increasing order of the inclination of the Q value. Thus, in the order starting from an existing path of an optical signal having a small quality margin, the optical network control device 1 may determine whether the Q value of the existing path reaches the target value. Therefore, the optical network control device 1 may detect early an existing path of which Q value may not reach the target value, so as to expedite the timing for performing the calculation of the route of the new path again.

As described above with reference to FIGS. 14A and 14B and FIGS. 16A and 16B, in a case where the power of the optical signal of the new path is increased, when it is determined that the Q value of the optical signal of the existing path measured by the transmission quality measurement unit 103 falls below (□Yes□ of operation St11), the power controller 102 increases the power of the optical signal of the existing path (operation St43). Thus, the Q value of the optical signal of the existing path is maintained at the target value.

Next, descriptions will be made on an example of the path setting and the equalization of the transmission quality by the network management method described above with reference to FIGS. 14A and 14B to FIGS. 16A and 16B. Here, as illustrated in FIG. 1, it is assumed that the optical network control device 1 sets the path Ra in the network NW for the first time. At this time, since no existing path exists in the network NW, the optical network control device 1 calculates the route of the path Ra by the shortest distance method through the process of operation St3, and repeats the processes of operations St8 to St14 so as to control the Q value of the optical signal of the path Ra to the target value.

In a case where the power of the optical signal of the path Ra is controlled to, for example, 0.6 dBm, when the Q value becomes the target value, the optical network control device 1 registers the power and the inclination of the Q value in the path DB 131 through the process of operation St15. At this time, the path DB 131 is the same as illustrated in FIG. 13. Here, the transmission characteristic measurement unit 103 calculates the inclination of the Q value from Equation (1).

(Setting of Second Path)

Next, it is assumed that the optical network control device 1 has received a request for the setting of a path between the nodes #4 and #6. When the threshold TH is 0.5, from the path DB 131 in which the inclination of the Q value of the existing path Ra is 0.99 larger than the threshold TH, the optical network control device 1 determines that the new path Rb may be set to overlap with at least a portion of the existing path Ra. Thus, the optical network control device 1 sets the metric of each link L of the existing path Ra with the link length, and calculates the route of a new path Rb through the process of operation St3.

Figure 17:
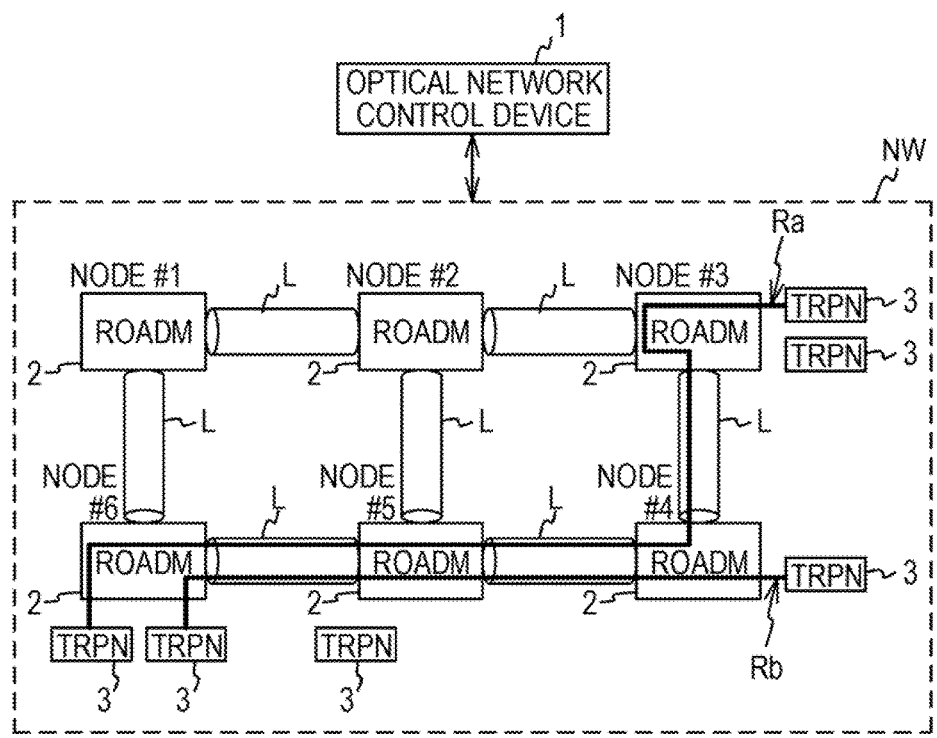
FIG. 17 is a view illustrating an example of a network in which two paths are set.

FIG. 17 is a diagram illustrating an example of the network NW in which the two paths Ra and Rb are set. The new path Rb passes through the nodes #4 to #6 in this order. The new path Rb overlaps with the link L between the nodes #4 and #5 and the link L between the nodes #5 and #6 in the existing path Ra.

Thus, in a case where the power of the optical signal of the new path Rb is increased, when the Q value of the optical signal of the existing path Ra falls below the target value, the optical network control device 1 adjusts the power of the optical signal of the existing path Ra such that the Q value of the existing path Ra becomes the target value, through the process of operation St17. Since there exists no other existing paths overlapping with the existing path Ra, the optical network control device 1 controls the Q value of the optical signal of the existing path Ra to the target value by repeating the processes of operations St43 to St50.

When the Q value of the existing path Ra does not reach the target value by the power adjustment, the optical network control device 1 determines that the power adjustment is failed through the process of operation St57, and deletes the new path Rb through the process of operation St20. In this case, the □usable/unusable state□ information of each link L of the existing path Ra is set to □unusable□ through the process of operation St19, and the route of the new path Rb is calculated again using the other links L.

The optical network control device 1 controls the Q value of the optical signal of each of the new path Rb and the existing path Ra to the target value by repeating the processes of operations St8 to St14, St17, and St18. When the Q value of the new path Rb ha decreased, the optical network control device 1 sets the □usable/unusable state□ information of each link L of the new path Rb to □unusable□ through the process of operation St19, and calculates the route of the new path Rb again.

FIG. 18 is a diagram illustrating an example of the path DB 131 in which the two paths Ra and Rb are registered. In a case where the power of the optical signal of the new path Rb is controlled to, for example, 0.5 dBm, when the Q value reaches the target value, the optical network control device 1 registers 0.5 dBm as the power of the new path Rb in the path DB 131 through the process of operation St15. At this time, the optical network control device 1 registers 0.85 as the inclination of the Q value.

In addition, in a case where the power of the optical signal of the existing path Ra is controlled to, for example, 0.7 dBm, when the Q value becomes the target value, the optical network control device 1 updates the power of the existing path Ra in the path DB 131 to 0.7 dBm through the process of operation St16. Further, the optical network control device 1 updates the inclination of the Q value of the existing path Ra in the path DB 131 to 0.49.

(Setting of Third Path)

Next, it is assumed that the optical network control device 1 has received a request for the setting of a path between the nodes #3 and #5. When the threshold TH is 0.5, from the path DB 131 in which the inclination of the Q value of the existing path Ra is 0.49 smaller than the threshold TH, the optical network control device 1 determines that the new path Rb may not be set to overlap with at least a portion of the existing path Ra. Thus, the optical network control device 1 sets the metric of each link L of the existing path Ra to be 2.04 times (1/0.49) the link length, and calculates the route of the new path Rb through the process of operation St3.

Figure 19:
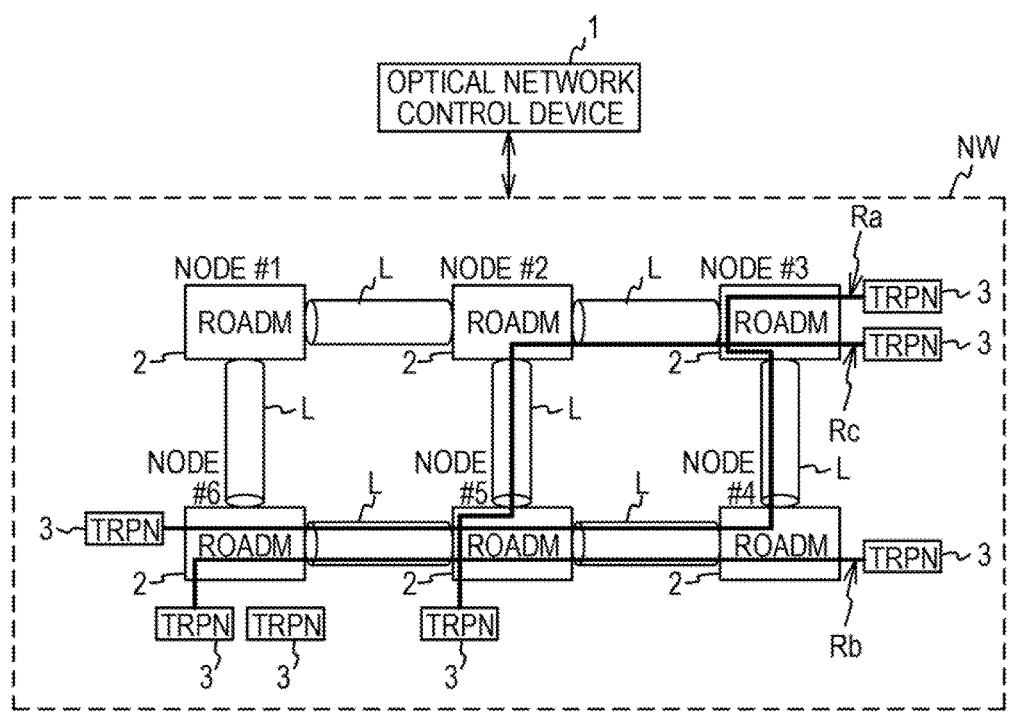
FIG. 19 is a view illustrating an example of a network in which three paths are set.

FIG. 19 is a view illustrating an example of the network NW in which three paths Ra to Rc are set. The new path Rc passes through the nodes #3, #2, and #5 in this order. Since the inclination of the Q value of the existing path Ra is smaller than the threshold TH, the new path Rc is set not to overlap with the route of the existing path Ra. The new path Rc is also set not to overlap with the route of the existing path Rb.

Since there exists no existing path overlapping with the new path Rc, the optical network control device 1 controls the Q value of the optical signal of the new path Rc to the target value by repeating the processes of operations St8 to St14. When the Q value of the new path Rc has decreased, the optical network control device 1 sets the □usable/unusable state□ information of each link L of the new path Rc to □unusable□ through the process of operation St19, and calculates the route of the new path Rc again by using the other links L.

FIG. 20 is a view illustrating an example of the DB 131 in which the three paths Ra to Rc are registered. In a case where the power of the optical signal of the new path Rc is controlled to, for example, 0.6 dBm, when the Q value becomes the target value, the optical network control device 1 registers 0.6 dBm as the power of the new path Rc in the path DB 131. At this time, the optical network control device 1 registers 0.91 as the inclination of the Q value.

(Setting of Fourth Path)

Next, it is assumed that the optical network control device 1 has received a request for the setting of a path between the nodes #4 and #6. In this example, for convenience of descriptions, the inclination of the Q value of the existing path Ra in the path DB 131 illustrated in FIG. 20 is changed from 0.49 to 0.55.

When the threshold TH is 0.5, from the path DB 131 in which the inclination of the Q value of the existing path Ra is 0.55 larger than the threshold TH, the optical network control device 1 determines that a new path Rd may be set to overlap with at least a portion of the existing path Ra. Further, since the inclinations of the Q values of the existing paths Rb and Rc in the path DB 131 are also larger than the threshold TH, the optical network control device 1 determines that the new path Rd may be set to overlap with at least a portion of the existing paths Rb and Rc. Thus, the optical network control device 1 sets the metric of each link L of the existing paths Ra to Rc with the link length and calculates the route of the new path Rd through the process of operation St3.

Figure 21:
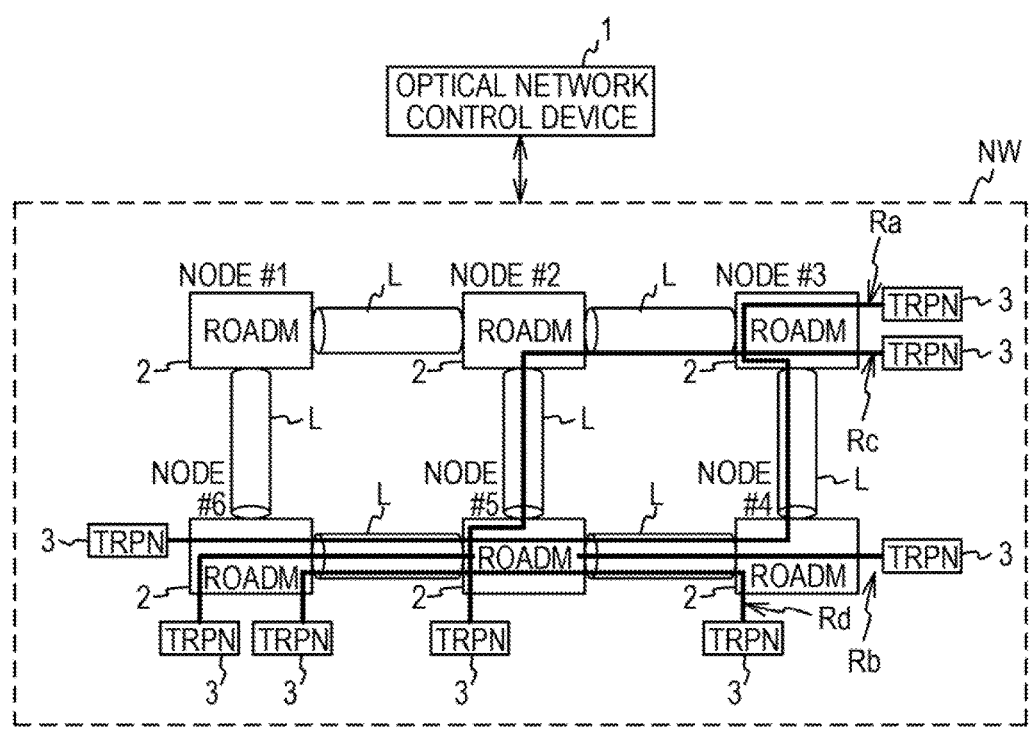
FIG. 21 is a view illustrating an example of a network in which four paths are set.

FIG. 21 is a view illustrating an example of the network NW in which the four paths Ra to Rd are set. The new path Rd passes through the nodes #4 to #6 in this order. The new path Rd overlaps with the other existing paths Ra and Rb in the link L between the nodes #4 and #5 and the link L between the nodes #5 and #6.

Thus, in a case where the power of the optical signal of the new path Rd is increased, when the Q values of the optical signals of the existing paths Ra and Rb fall below the target value, the optical network control device 1 adjusts the powers of the optical signals of the existing paths Ra and Rb such that the Q values of the existing paths Ra and Rb become the target value. At this time, the optical network control device 1 compares the inclinations of the Q values of the existing paths Ra and Rb through the process of operation St41, and since the inclination of the Q value of the existing path Ra is smaller than the inclination of the Q value of the existing path Rb, the optical network control device 1 adjusts the power of the existing path Ra, and then, adjusts the power of the existing path Rb.

In this way, since the optical network control device 1 adjusts the power of the existing path Ra having a small quality margin before adjusting the power of the existing path Rb having a large quality margin, the optical network control device 1 may determine the failure of the power adjustment at an early timing. Further, since the existing path Rc does not overlap with the new path Rd, the power adjustment of the optical signal of the existing path Rc is not performed.

When the Q values of the existing paths Ra and Rb do not reach the target value by the power adjustment, the optical network control device 1 determines that the power adjustment is failed through the process of operation St57, and deletes the new path Rd through the process of operation St20. In this case, the □usable/unusable state□ information of each link L of the existing paths Ra and Rb is set to □unusable□ through the process of operation St19, and the route of the new path Rd is calculated again by using the other links L.

The optical network control device 1 controls the Q value of the optical signal of each of the new paths Rd and the existing paths Ra and Rb to the target value, by repeating the processes of operations St8 to St14, St17, and St18. In addition, when the Q value of the new path Rd has decreased, the optical network control device 1 sets the □usable/unusable state□ information of each link L of the new path Rd to □unusable□ through the process of operation St19, and calculates the route of the new path Rd again by using the other links L.

Figure 22:
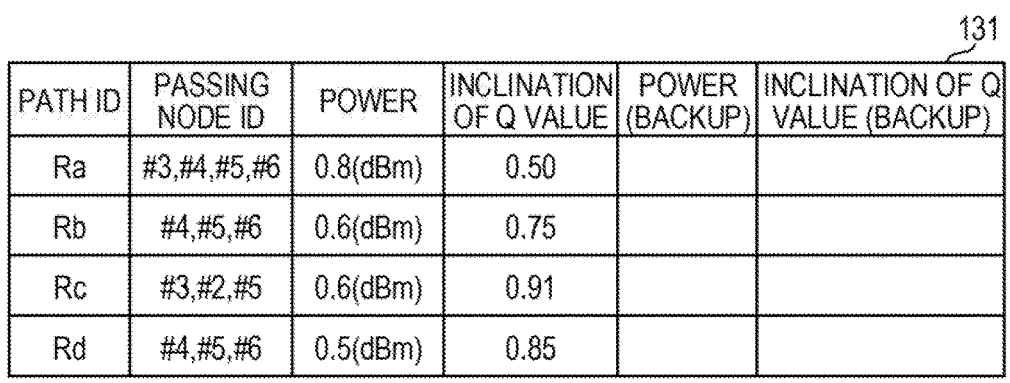
FIG. 22 is a view illustrating an example of a path database in which the four paths are registered.

FIG. 22 is a view illustrating an example of the path DB 131 in which the four paths Ra to Rd are registered. In a case where the power of the optical signal of the new path Rd is controlled to, for example, 0.5 dBm, when the Q value reaches the target value, the optical network control device 1 registers 0.5 dBm as the power of the new path Rd in the path DB 131 through the process of operation St15. At this time, the optical network control device 1 registers 0.85 as the inclination of the Q value.

In a case where the power of the optical signal of the existing path Ra is controlled to, for example, 0.8 dBm, when the Q value reaches the target value, the optical network control device 1 updates the power of the existing path Ra in the path DB 131 to 0.8 dBm through the process of operation St16. Further, the optical network control device 1 updates the inclination of the Q value of the existing path Ra in the path DB 131 to 0.50.

In addition, in a case where the power of the optical signal of the existing path Rb is controlled to, for example, 0.6 dBm, when the Q value reaches the target value, the optical network control device 1 updates the power of the existing path Rb in the path DB 131 to 0.6 dBm through the process of operation St16. Further, the optical network control device 1 updates the inclination of the Q value of the existing path Rb in the path DB 131 to 0.75.

In this way, the optical network control device 1 equalizes the transmission quality of the optical signal of each of the paths Ra to Rd. Thus, the optical signal of each of the paths Ra to Rd may maintain the required transmission quality.

Further, the above-described process functions may be implemented by a computer. In that case, a program is provided which describes process contents of functions of a process device. By executing the program by a computer, the process functions are implemented on the computer. The program describing the process contents may be stored in a computer-readable storage medium (excluding a carrier wave).

When the program is distributed, for example, the program is sold in the form of a portable storage medium such as a digital versatile disc (DVD) or a compact disc only memory (CD-ROM) in which the program is stored. Further, the program may be stored in a storage device of a server computer and transferred from the server computer to another computer through a network.

For example, the computer executing the program stores the program stored in the portable storage medium or the program transferred from the server computer, in its own storage device. Then, the computer reads the program from its own storage device and executes the processes according to the program. Further, the computer may read the program directly from the portable storage medium and execute the processes according to the program. Further, each time the program is transferred from the server computer, the computer may sequentially execute a process according to the received program.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A network management device comprising:
   a memory in which a change rate of a transmission quality of a first optical signal to be transmitted on a first path with respect to a power of the first optical signal is stored; and
   a processor coupled to the memory and the processor configured to determine, based on the change rate, whether to set a second path on which a second optical signal transmits to overlap with at least a portion of a route of the first path.

2. The network management device according to claim 1, wherein the processor is configured to set the second path according to a result of determining whether to set the second path.

3. The network management device according to claim 2, wherein, when the change rate is equal to or less than a predetermined value, the processor is configured to set the second path not to overlap with the route of the first path, by setting a link-selection priority for one or more links included in the first path to be lower than the link-selection priority for other links, the link-selection priority being a priority for selecting a link in setting the second path.

4. The network management device according to claim 2, wherein the processor is further configured to:
   control powers of the first optical signal and the second optical signal, and
   measure transmission qualities of the first optical signal and the second optical signal,
   wherein the change rate of the transmission quality of the first optical signal with respect to the power of the first optical signal is stored in the memory, when the transmission quality of the first optical signal is a first predetermined value, and
   wherein the processor is configured to increase the power of the first optical signal, in a case where the power of the second optical signal is increased, when the measured transmission quality of the first optical signal falls below the first predetermined value.

5. The network management device according to claim 4, wherein the processor is configured to delete the second path, in a case where the power of the second optical signal is increased, when the transmission quality of the measured second optical signal is deteriorated.

6. The network management device according to claim 4, wherein the processor is further configured to update the change rate stored in the memory, in a case where the power of the first optical signal is increased, when the measured transmission quality of the first optical signal reaches the first predetermined value.

7. The network management device according to claim 4, wherein the processor is configured to increase the power of the first optical signal in an ascending order of the change rate, in a case where a plurality of first paths exist.

8. A computer-readable non-transitory recording medium storing a program that causes a computer to execute a procedure, the procedure comprising:
   storing a change rate of a transmission quality of a first optical signal to be transmitted on a first path with respect to a power of the first optical signal in a memory, and
   determining, based on the change rate, whether to set a second path on which a second optical signal transmits to overlap with at least a portion of a route of the first path so as to set the second path according to a result of the determining.

9. The computer-readable non-transitory recording medium according to claim 8,
   wherein, when the change rate is equal to or less than a predetermined value, the procedure sets the second path not to overlap with the route of the first path, by setting a link-selection priority for one or more links included in the first path to be lower than the link-selection priority for other links, the link-selection priority being a priority for selecting a link in setting the second path.

10. The computer-readable non-transitory recording medium according to claim 8,
wherein the procedure further comprising:
controlling powers of the first optical signal and the second optical signal, and
measuring transmission qualities of the first optical signal and the second optical signal,
wherein the change rate of the transmission quality of the first optical signal with respect to the power of the first optical signal is stored in the memory, when the transmission quality of the first optical signal is a first predetermined value, and
wherein the procedure increases the power of the first optical signal, in a case where the power of the second optical signal is increased, when the measured transmission quality of the first optical signal falls below the first predetermined value.

11. The computer-readable non-transitory recording medium according to claim 10,
wherein the second path is deleted, in a case where the power of the second optical signal is increased, when the transmission quality of the measured second optical signal is deteriorated.

12. The computer-readable non-transitory recording medium according to claim 10,
wherein the procedure further comprising:
updating the change rate stored in the memory, in a case where the power of the first optical signal is increased, when the measured transmission quality of the first optical signal reaches the first predetermined value.

13. The computer-readable non-transitory recording medium according to claim 10,
wherein the power of the first optical signal is increased in an ascending order of the change rate, in a case where a plurality of first paths exist.

14. A network management method comprising:
storing a change rate of a transmission quality of a first optical signal to be transmitted on a first path with respect to a power of the first optical signal in a memory, and
determining, based on the change rate, whether to set a second path on which a second optical signal transmits to overlap with at least a portion of a route of the first path, by a processor.

15. The network management method according to claim 14,
wherein the processor sets the second path according to a result of determining whether to set the second path.

16. The network management method according to claim 15,
wherein, when the change rate is equal to or less than a predetermined value, the processor sets the second path not to overlap with the route of the first path, by setting a link-selection priority for one or more links included in the first path to be lower than the link-selection priority for other links, the link-selection priority being a priority for selecting a link in setting the second path.

17. The network management method according to claim 15, further comprising:
controlling powers of the first optical signal and the second optical signal, and
measuring transmission qualities of the first optical signal and the second optical signal, by the processor,
wherein the change rate of the transmission quality of the first optical signal with respect to the power of the first optical signal is stored in the memory, when the transmission quality of the first optical signal is a first predetermined value, and
wherein the processor increases the power of the first optical signal, in a case where the power of the second optical signal is increased, when the measured transmission quality of the first optical signal falls below the first predetermined value.

18. The network management method according to claim 17,
wherein the processor deletes the second path, in a case where the power of the second optical signal is increased, when the transmission quality of the measured second optical signal is deteriorated.

19. The network management method according to claim 17,
wherein the processor updates the change rate stored in the memory, in a case where the power of the first optical signal is increased, when the measured transmission quality of the first optical signal reaches the first predetermined value.

20. The network management method according to claim 17,
wherein the processor increases the power of the first optical signal in an ascending order of the change rate, in a case where a plurality of first paths exist.

* * * * *